US008799954B1

(12) United States Patent
Ellis

(10) Patent No.: US 8,799,954 B1
(45) Date of Patent: Aug. 5, 2014

(54) SYSTEMS AND METHODS FOR PROVIDING CUSTOM MEDIA CONTENT FLIPPING

(75) Inventor: Michael D. Ellis, Boulder, CO (US)

(73) Assignee: Rovi Guides, Inc., Santa Clara, CA (US)

( * ) Notice: Subject to any disclaimer, the term of this patent is extended or adjusted under 35 U.S.C. 154(b) by 526 days.

(21) Appl. No.: 11/888,678

(22) Filed: Jul. 31, 2007

Related U.S. Application Data

(60) Provisional application No. 60/834,605, filed on Jul. 31, 2006, provisional application No. 60/903,808, filed on Feb. 26, 2007.

(51) Int. Cl.
*H04N 5/445* (2011.01)

(52) U.S. Cl.
USPC .................................. 725/46; 725/47; 725/52

(58) Field of Classification Search
CPC .......... H04N 21/42204; H04N 21/431; H04N 21/482
USPC ................................. 725/46, 47, 52
See application file for complete search history.

(56) References Cited

U.S. PATENT DOCUMENTS

| | | | |
|---|---|---|---|
| 3,440,427 A | 4/1969 | Kammer |
| 3,492,577 A | 1/1970 | Reiter et al. |
| 3,493,674 A | 2/1970 | Houghton |
| 3,833,757 A | 9/1974 | Kirk, Jr. et al. |
| 3,848,193 A | 11/1974 | Martin et al. |
| 3,891,792 A | 6/1975 | Kirmua |
| 3,893,049 A | 7/1975 | Bray |
| 3,936,868 A | 2/1976 | Thorpe |
| 3,956,745 A | 5/1976 | Ellis et al. |
| 3,996,583 A | 12/1976 | Hutt et al. |
| 4,004,085 A | 1/1977 | Makino et al. |
| 4,016,361 A | 4/1977 | Pandey |
| 4,026,555 A | 5/1977 | Kirschner |
| 4,031,548 A | 6/1977 | Kato et al. |
| 4,052,719 A | 10/1977 | Hutt et al. |
| 4,079,419 A | 3/1978 | Siegle et al. |
| 4,081,753 A | 3/1978 | Miller |
| 4,081,754 A | 3/1978 | Jackson |
| 4,096,524 A | 6/1978 | Scott |

(Continued)

FOREIGN PATENT DOCUMENTS

| | | |
|---|---|---|
| CA | 1196082 | 10/1985 |
| CA | 1217269 | 1/1987 |

(Continued)

OTHER PUBLICATIONS

"JVC Instruction Book: Color TVS C-2018/C-2028/C-2038," JVC Company of America, Elmwood Park, NJ (12 pp.).

(Continued)

*Primary Examiner* — Junior Mendoza
(74) *Attorney, Agent, or Firm* — Ropes & Gray LLP

(57) ABSTRACT

Systems and methods for providing enhanced channel flipping are disclosed. A user may selectively mark and unmark channels as temporary favorite channels. These channels may be dynamically added or removed from the channel changing or channel flipping sequence. Unauthorized channels and channels locked by parental controls may also be automatically removed from the channel flipping sequence. A plurality of custom channel flipping sequences may be maintained on the user equipment device. Users may access any of these custom channel flipping sequences in order to flip only through the channels associated with the custom sequence. Channels in the flipping sequence may also be pre-tuned in order to reduce delays associated with tuning.

27 Claims, 15 Drawing Sheets

(56) References Cited

U.S. PATENT DOCUMENTS

| | | | |
|---|---|---|---|
| 4,134,127 | A | 1/1979 | Campioni |
| 4,139,860 | A | 2/1979 | Micic et al. |
| 4,150,254 | A | 4/1979 | Schussler et al. |
| 4,156,198 | A | 5/1979 | Heuer |
| 4,156,850 | A | 5/1979 | Beyers |
| 4,161,728 | A | 7/1979 | Insam |
| 4,162,513 | A | 7/1979 | Beyers, Jr. et al. |
| 4,170,782 | A | 10/1979 | Miller |
| 4,186,413 | A | 1/1980 | Mortimer |
| 4,189,781 | A | 2/1980 | Douglas |
| 4,203,130 | A | 5/1980 | Doumit et al. |
| 4,205,343 | A | 5/1980 | Barrett |
| 4,218,698 | A | 8/1980 | Bart et al. |
| 4,224,644 | A | 9/1980 | Lewis et al. |
| 4,228,543 | A | 10/1980 | Jackson |
| 4,231,031 | A | 10/1980 | Crowther et al. |
| 4,233,628 | A | 11/1980 | Ciciora |
| 4,249,211 | A | 2/1981 | Baba et al. |
| 4,261,006 | A | 4/1981 | Weintraub et al. |
| 4,264,924 | A | 4/1981 | Freeman |
| 4,264,925 | A | 4/1981 | Freeman |
| 4,270,145 | A | 5/1981 | Farina |
| 4,276,597 | A | 6/1981 | Dissly et al. |
| 4,283,787 | A | 8/1981 | Chambers |
| 4,288,809 | A | 9/1981 | Yabe |
| 4,305,101 | A | 12/1981 | Yarbrough et al. |
| 4,325,081 | A | 4/1982 | Abe et al. |
| 4,329,684 | A | 5/1982 | Monteath et al. |
| 4,337,480 | A | 6/1982 | Bourassin et al. |
| 4,337,483 | A | 6/1982 | Gillou |
| 4,338,644 | A | 7/1982 | Staar |
| 4,339,798 | A | 7/1982 | Hedges et al. |
| 4,344,090 | A | 8/1982 | Belisomi et al. |
| 4,347,498 | A | 8/1982 | Lee et al. |
| 4,375,651 | A | 3/1983 | Templin et al. |
| 4,381,522 | A | 4/1983 | Lambert |
| 4,388,645 | A | 6/1983 | Cox et al. |
| 4,390,901 | A | 6/1983 | Keiser |
| 4,393,376 | A | 7/1983 | Thomas |
| 4,394,691 | A | 7/1983 | Amano et al. |
| 4,403,285 | A | 9/1983 | Kikuchi |
| 4,405,946 | A | 9/1983 | Knight |
| 4,412,244 | A | 10/1983 | Shanley, II |
| 4,413,281 | A | 11/1983 | Thonnart |
| 4,420,769 | A | 12/1983 | Novak |
| 4,422,105 | A | 12/1983 | Rodesch et al. |
| 4,425,579 | A | 1/1984 | Merrell |
| 4,425,581 | A | 1/1984 | Schweppe et al. |
| 4,429,385 | A | 1/1984 | Cichelli et al. |
| 4,449,249 | A | 5/1984 | Price |
| 4,456,925 | A | 6/1984 | Skerlos et al. |
| 4,477,830 | A | 10/1984 | Lindman et al. |
| 4,488,179 | A | 12/1984 | Kruger et al. |
| 4,495,654 | A | 1/1985 | Deiss |
| 4,496,171 | A | 1/1985 | Cherry |
| 4,496,804 | A | 1/1985 | Hung |
| 4,496,976 | A | 1/1985 | Swanson et al. |
| 4,510,623 | A | 4/1985 | Bonneau et al. |
| 4,520,404 | A | 5/1985 | Von Kohorn |
| 4,527,194 | A | 7/1985 | Sirazi |
| 4,531,020 | A | 7/1985 | Wechselberger et al. |
| 4,535,333 | A | 8/1985 | Twardowski |
| 4,536,791 | A | 8/1985 | Campbell et al. |
| 4,547,804 | A | 10/1985 | Greenberg |
| 4,554,584 | A | 11/1985 | Elam et al. |
| 4,566,034 | A * | 1/1986 | Harger et al. ............... 348/734 |
| 4,573,072 | A | 2/1986 | Freeman |
| 4,587,520 | A | 5/1986 | Astle |
| 4,595,951 | A | 6/1986 | Filliman |
| 4,595,952 | A | 6/1986 | Filliman |
| 4,598,288 | A | 7/1986 | Yarbrough et al. |
| 4,605,964 | A | 8/1986 | Chard |
| 4,605,973 | A | 8/1986 | Von Kohorn |
| 4,608,859 | A | 9/1986 | Rockley |
| 4,611,269 | A | 9/1986 | Suzuki et al. |
| 4,620,229 | A | 10/1986 | Amano et al. |
| 4,622,545 | A | 11/1986 | Atkinson |
| 4,625,080 | A | 11/1986 | Scott |
| 4,626,848 | A | 12/1986 | Ehlers |
| 4,635,121 | A | 1/1987 | Hoffman |
| 4,641,205 | A | 2/1987 | Beyers, Jr. |
| 4,677,466 | A | 6/1987 | Lert, Jr. et al. |
| 4,685,131 | A | 8/1987 | Horne |
| 4,689,022 | A | 8/1987 | Peers et al. |
| 4,691,351 | A | 9/1987 | Hayashi et al. |
| 4,694,490 | A | 9/1987 | Harvey et al. |
| 4,701,794 | A | 10/1987 | Froling et al. |
| 4,706,121 | A | 11/1987 | Young |
| 4,712,105 | A | 12/1987 | Kohler |
| 4,718,107 | A | 1/1988 | Hayes |
| 4,737,993 | A | 4/1988 | DeVilbis |
| 4,739,406 | A | 4/1988 | Morton et al. |
| 4,750,036 | A | 6/1988 | Martinez |
| 4,750,213 | A | 6/1988 | Novak |
| 4,751,578 | A | 6/1988 | Reiter et al. |
| 4,754,326 | A | 6/1988 | Kram et al. |
| 4,768,228 | A | 8/1988 | Clupper et al. |
| 4,775,935 | A | 10/1988 | Yourick |
| 4,787,063 | A | 11/1988 | Muguet |
| 4,789,962 | A | 12/1988 | Berry et al. |
| 4,802,114 | A | 1/1989 | Sogame |
| 4,807,052 | A | 2/1989 | Amano |
| 4,809,325 | A | 2/1989 | Hayashi et al. |
| 4,812,940 | A | 3/1989 | Takenaga |
| 4,821,102 | A | 4/1989 | Ichikawa et al. |
| 4,821,211 | A | 4/1989 | Torres |
| 4,841,132 | A | 6/1989 | Kajitani et al. |
| 4,841,368 | A | 6/1989 | Rumbolt et al. |
| 4,843,482 | A | 6/1989 | Hegendorfer |
| 4,847,696 | A | 7/1989 | Matsumoto et al. |
| 4,855,833 | A | 8/1989 | Kageyama et al. |
| 4,862,268 | A | 8/1989 | Campbell et al. |
| 4,868,735 | A | 9/1989 | Moller et al. |
| 4,873,584 | A | 10/1989 | Hashimoto |
| 4,879,611 | A | 11/1989 | Fukiu et al. |
| 4,885,775 | A | 12/1989 | Lucas |
| 4,888,796 | A | 12/1989 | Olivo, Jr. |
| 4,890,321 | A | 12/1989 | Seth-Smith et al. |
| 4,894,789 | A | 1/1990 | Yee |
| 4,908,707 | A | 3/1990 | Kinghorn |
| 4,908,713 | A | 3/1990 | Levine |
| 4,908,859 | A | 3/1990 | Bennett et al. |
| 4,914,516 | A | 4/1990 | Duffield |
| 4,914,517 | A | 4/1990 | Duffield |
| 4,930,158 | A | 5/1990 | Vogel |
| 4,930,160 | A | 5/1990 | Vogel |
| 4,959,720 | A | 9/1990 | Duffield et al. |
| 4,963,994 | A | 10/1990 | Levine |
| 4,977,455 | A | 12/1990 | Young |
| 4,989,104 | A | 1/1991 | Schulein et al. |
| 4,991,011 | A | 2/1991 | Johnson et al. |
| 4,996,597 | A | 2/1991 | Duffield |
| 4,998,171 | A | 3/1991 | Kim et al. |
| 5,005,084 | A | 4/1991 | Skinner |
| 5,023,727 | A | 6/1991 | Boyd |
| 5,027,400 | A | 6/1991 | Baji et al. |
| 5,038,211 | A | 8/1991 | Hallenbeck |
| 5,045,947 | A | 9/1991 | Beery |
| 5,047,867 | A | 9/1991 | Strubbe et al. |
| 5,068,734 | A | 11/1991 | Beery |
| 5,091,785 | A | 2/1992 | Canfield et al. |
| 5,103,314 | A | 4/1992 | Keenan |
| 5,123,046 | A | 6/1992 | Levine |
| 5,151,789 | A | 9/1992 | Young |
| 5,155,762 | A | 10/1992 | Croquet et al. |
| 5,161,023 | A | 11/1992 | Keenan |
| 5,172,111 | A | 12/1992 | Olivo, Jr. |
| 5,179,439 | A | 1/1993 | Hashimoto |
| 5,179,654 | A | 1/1993 | Richards |
| 5,187,589 | A | 2/1993 | Kono et al. |
| 5,193,005 | A | 3/1993 | Tomita |
| 5,193,009 | A | 3/1993 | Park |
| 5,194,941 | A | 3/1993 | Grimaldi et al. |
| 5,200,823 | A | 4/1993 | Yoneda et al. |

(56) References Cited

U.S. PATENT DOCUMENTS

| | | |
|---|---|---|
| 5,210,611 A | 5/1993 | Yee et al. |
| 5,223,924 A | 6/1993 | Strubbe |
| 5,231,493 A | 7/1993 | Apitz |
| 5,235,415 A | 8/1993 | Bonicel et al. |
| 5,237,411 A | 8/1993 | Fink et al. |
| 5,237,417 A | 8/1993 | Hayashi et al. |
| 5,253,066 A | 10/1993 | Vogel |
| 5,253,067 A | 10/1993 | Chaney et al. |
| 5,260,788 A | 11/1993 | Takano |
| 5,293,357 A | 3/1994 | Hallenbeck |
| 5,301,028 A | 4/1994 | Banker et al. |
| 5,307,173 A | 4/1994 | Yuen et al. |
| 5,317,403 A | 5/1994 | Keenan |
| 5,323,234 A | 6/1994 | Kawasaki |
| 5,335,277 A | 8/1994 | Harvey et al. |
| 5,353,121 A | 10/1994 | Young et al. |
| 5,355,079 A | 10/1994 | Evans et al. |
| 5,355,162 A | 10/1994 | Yazolino et al. |
| 5,357,276 A | 10/1994 | Banker et al. |
| 5,359,601 A | 10/1994 | Wasilewski et al. |
| 5,371,553 A | 12/1994 | Kawamura et al. |
| 5,373,288 A | 12/1994 | Blahut |
| 5,377,319 A | 12/1994 | Kitahara et al. |
| 5,382,983 A | 1/1995 | Kwoh et al. |
| 5,384,910 A | 1/1995 | Torres |
| 5,390,027 A | 2/1995 | Henmi et al. |
| 5,398,074 A | 3/1995 | Duffield et al. |
| 5,404,393 A | 4/1995 | Remillard |
| 5,410,326 A | 4/1995 | Goldstein |
| 5,412,377 A | 5/1995 | Evans et al. |
| 5,412,720 A | 5/1995 | Hoarty |
| 5,416,895 A | 5/1995 | Anderson et al. |
| 5,418,621 A | 5/1995 | Park |
| 5,425,101 A | 6/1995 | Woo et al. |
| 5,434,678 A | 7/1995 | Abecassis |
| 5,473,442 A | 12/1995 | Kim |
| 5,477,262 A | 12/1995 | Banker et al. |
| 5,479,266 A | 12/1995 | Young et al. |
| 5,479,268 A | 12/1995 | Young et al. |
| 5,485,197 A | 1/1996 | Hoarty |
| 5,485,221 A | 1/1996 | Banker et al. |
| 5,485,518 A | 1/1996 | Hunter et al. |
| 5,488,409 A | 1/1996 | Yuen et al. |
| 5,502,504 A | 3/1996 | Marshall et al. |
| 5,508,815 A | 4/1996 | Levine |
| 5,523,791 A | 6/1996 | Berman |
| 5,523,796 A | 6/1996 | Marshall et al. |
| 5,526,034 A | 6/1996 | Hoarty et al. |
| 5,528,304 A | 6/1996 | Cherrick et al. |
| 5,530,684 A | 6/1996 | Kataoka et al. |
| 5,532,754 A | 7/1996 | Young et al. |
| 5,541,738 A | 7/1996 | Mankovitz |
| 5,546,521 A | 8/1996 | Martinez |
| 5,552,833 A | 9/1996 | Henmi et al. |
| 5,557,724 A | 9/1996 | Sampat et al. |
| 5,559,548 A | 9/1996 | Davis et al. |
| 5,559,549 A | 9/1996 | Hendricks et al. |
| 5,561,471 A | 10/1996 | Kim et al. |
| 5,579,055 A | 11/1996 | Hamilton et al. |
| 5,583,560 A | 12/1996 | Florin et al. |
| 5,584,525 A | 12/1996 | Nakano et al. |
| 5,585,838 A | 12/1996 | Lawler et al. |
| 5,585,866 A | 12/1996 | Miller et al. |
| 5,589,892 A | 12/1996 | Knee et al. |
| 5,592,551 A | 1/1997 | Lett et al. |
| 5,594,509 A | 1/1997 | Florin et al. |
| 5,596,361 A | 1/1997 | Martinez |
| 5,596,419 A | 1/1997 | Yoshimura et al. |
| 5,600,364 A | 2/1997 | Hendricks et al. |
| 5,602,600 A | 2/1997 | Queinnec |
| 5,621,456 A | 4/1997 | Florin et al. |
| 5,623,282 A | 4/1997 | Graham et al. |
| 5,657,414 A | 8/1997 | Lett et al. |
| 5,659,350 A | 8/1997 | Hendricks et al. |
| 5,677,708 A | 10/1997 | Matthews, III et al. |
| 5,682,195 A | 10/1997 | Hendricks et al. |
| 5,684,525 A | 11/1997 | Klosterman |
| 5,699,107 A | 12/1997 | Lawler et al. |
| 5,727,060 A | 3/1998 | Young |
| 5,731,844 A | 3/1998 | Rauch et al. |
| 5,734,853 A | 3/1998 | Hendricks et al. |
| 5,742,563 A | 4/1998 | Kataoka et al. |
| 5,745,710 A | 4/1998 | Clanton et al. |
| 5,774,887 A | 6/1998 | Wolff et al. |
| 5,781,246 A | 7/1998 | Alten et al. |
| 5,797,011 A | 8/1998 | Kroll et al. |
| 5,798,785 A | 8/1998 | Hendricks et al. |
| 5,801,787 A | 9/1998 | Schein et al. |
| 5,808,608 A | 9/1998 | Young et al. |
| 5,809,204 A | 9/1998 | Young et al. |
| 5,822,123 A | 10/1998 | Davis et al. |
| 5,892,498 A | 4/1999 | Marshall et al. |
| 5,915,068 A | 6/1999 | Levine |
| 5,933,192 A * | 8/1999 | Crosby et al. ............ 375/240.25 |
| 5,936,614 A | 8/1999 | An et al. |
| 5,940,073 A | 8/1999 | Klosterman et al. |
| 5,940,614 A | 8/1999 | Allen et al. |
| 5,949,954 A | 9/1999 | Young et al. |
| 5,970,206 A | 10/1999 | Yuen et al. |
| 5,990,927 A | 11/1999 | Hendricks et al. |
| 5,991,498 A | 11/1999 | Young |
| 6,016,108 A * | 1/2000 | Terk et al. ................ 340/825.72 |
| 6,020,929 A | 2/2000 | Marshall et al. |
| 6,058,238 A | 5/2000 | Ng et al. |
| 6,061,060 A | 5/2000 | Berry et al. |
| 6,141,003 A * | 10/2000 | Chor et al. .................... 715/719 |
| 6,160,989 A | 12/2000 | Hendricks et al. |
| 6,167,188 A | 12/2000 | Young et al. |
| 6,239,794 B1 * | 5/2001 | Yuen et al. ....................... 725/41 |
| 6,320,588 B1 | 11/2001 | Palmer et al. |
| 6,384,869 B1 * | 5/2002 | Sciammarella et al. ...... 348/564 |
| 6,430,358 B1 | 8/2002 | Yuen et al. |
| 6,498,895 B2 | 12/2002 | Young et al. |
| 6,515,680 B1 | 2/2003 | Hendricks et al. |
| 6,678,706 B1 | 1/2004 | Fishel |
| 6,832,385 B2 | 12/2004 | Young et al. |
| 6,850,693 B2 | 2/2005 | Young |
| 7,151,886 B2 | 12/2006 | Young et al. |
| 7,187,847 B2 | 3/2007 | Young et al. |
| 7,209,640 B2 | 4/2007 | Young et al. |
| 7,260,147 B2 | 8/2007 | Gordon et al. |
| 7,363,645 B1 | 4/2008 | Hendricks |
| 7,477,832 B2 | 1/2009 | Young et al. |
| 7,748,018 B2 | 6/2010 | Young et al. |
| 2001/0012439 A1 | 8/2001 | Young et al. |
| 2001/0024564 A1 | 9/2001 | Young et al. |
| 2002/0056098 A1 * | 5/2002 | White ............................ 725/39 |
| 2002/0186959 A1 | 12/2002 | Young et al. |
| 2003/0142957 A1 | 7/2003 | Young et al. |
| 2003/0159147 A1 | 8/2003 | Young et al. |
| 2003/0185545 A1 | 10/2003 | Young et al. |
| 2004/0008971 A1 | 1/2004 | Young et al. |
| 2004/0117831 A1 * | 6/2004 | Ellis et al. ...................... 725/53 |
| 2004/0133910 A1 | 7/2004 | Gordon et al. |
| 2005/0044567 A1 | 2/2005 | Young et al. |
| 2005/0058433 A1 | 3/2005 | Young |
| 2005/0114885 A1 * | 5/2005 | Shikata et al. .................. 725/38 |
| 2005/0157251 A1 | 7/2005 | Hendricks |
| 2005/0198666 A1 * | 9/2005 | Hsieh ............................. 725/46 |
| 2005/0229214 A1 | 10/2005 | Young et al. |
| 2005/0251827 A1 * | 11/2005 | Ellis et al. ...................... 725/47 |
| 2005/0251828 A1 | 11/2005 | Young et al. |
| 2005/0251831 A1 | 11/2005 | Young et al. |
| 2005/0251836 A1 | 11/2005 | Young et al. |
| 2006/0003693 A1 | 1/2006 | Onomatsu et al. .......... 455/3.02 |
| 2007/0009229 A1 * | 1/2007 | Liu ................................. 386/83 |
| 2007/0083895 A1 * | 4/2007 | McCarthy et al. ............. 725/46 |
| 2007/0157242 A1 * | 7/2007 | Cordray et al. ................ 725/46 |
| 2008/0066111 A1 | 3/2008 | Ellis et al. |
| 2008/0098431 A1 | 4/2008 | Young et al. |
| 2008/0127261 A1 * | 5/2008 | Ijeomah et al. ................. 725/40 |

(56) References Cited

U.S. PATENT DOCUMENTS

| | | |
|---|---|---|
| 2010/0180300 A1 | 7/2010 | Carpenter et al. |
| 2010/0325668 A1 | 12/2010 | Young et al. |

FOREIGN PATENT DOCUMENTS

| | | |
|---|---|---|
| DE | 2338380 | 2/1975 |
| DE | 2918846 | 11/1980 |
| DE | 3246225 | 6/1984 |
| DE | 3337204 | 4/1985 |
| DE | 3527939 | 2/1987 |
| DE | 3621263 | 1/1988 |
| DE | 3623924 | 2/1988 |
| DE | 3921847 | 1/1991 |
| DE | 4240187 | 6/1994 |
| EP | 0 051 228 | 5/1982 |
| EP | 0 191 149 | 8/1986 |
| EP | 0 256 295 | 2/1988 |
| EP | 0 300 562 | 1/1989 |
| EP | 0 337 336 | 10/1989 |
| EP | 0 339 675 | 11/1989 |
| EP | 0 363 653 | 4/1990 |
| EP | 0 393 555 | 10/1990 |
| EP | 0 393 955 | 10/1990 |
| EP | 0 401 015 A2 | 12/1990 |
| EP | 0 401 930 | 12/1990 |
| EP | 0 408 892 | 1/1991 |
| EP | 0 444 496 | 9/1991 |
| EP | 0 447 968 | 9/1991 |
| EP | 0 472 147 | 2/1992 |
| EP | 0 532 322 | 3/1992 |
| EP | 0477756 A2 | 4/1992 |
| EP | 0 488 379 | 6/1992 |
| EP | 0 536 901 | 4/1993 |
| EP | 0 548 286 | 6/1993 |
| EP | 0 560 593 | 9/1993 |
| EP | 0 572 090 | 12/1993 |
| EP | 0 775 417 | 5/1997 |
| EP | 0 827 340 | 3/1998 |
| EP | 0 836 321 | 4/1998 |
| EP | 0 854 645 | 7/1998 |
| EP | 0 969 662 B1 | 1/2000 |
| EP | 1 213 919 | 6/2002 |
| EP | 1 377 049 B1 | 1/2004 |
| EP | 1 613 066 B1 | 1/2006 |
| EP | 1 763 234 | 3/2007 |
| FR | 2662895 | 12/1991 |
| GB | 1370535 | 10/1974 |
| GB | 1554411 | 10/1979 |
| GB | 2034995 | 6/1980 |
| GB | 2062424 | 5/1981 |
| GB | 2126002 | 3/1984 |
| GB | 2155713 | 9/1985 |
| GB | 2185670 | 7/1987 |
| GB | 2210526 | 6/1989 |
| GB | 2217144 | 10/1989 |
| GB | 2256546 | 12/1992 |
| JP | 58-210776 | 12/1983 |
| JP | 59-123373 | 7/1984 |
| JP | 59-141878 | 8/1984 |
| JP | 60-061935 | 4/1985 |
| JP | 60-069850 | 4/1985 |
| JP | 60-171685 | 9/1985 |
| JP | 61-050470 | 3/1986 |
| JP | 61-074476 | 4/1986 |
| JP | 61-109379 | 5/1986 |
| JP | 61-227486 | 10/1986 |
| JP | 62-008389 | 1/1987 |
| JP | 62-049528 | 3/1987 |
| JP | 62-060370 | 3/1987 |
| JP | 62-060377 | 3/1987 |
| JP | 62-060384 | 3/1987 |
| JP | 62-066493 | 3/1987 |
| JP | 62-082325 | 4/1987 |
| JP | 62-198768 | 12/1987 |
| JP | 63-023690 | 2/1988 |
| JP | 63-054830 | 3/1988 |
| JP | 63-054884 | 3/1988 |
| JP | 63-059075 | 3/1988 |
| JP | 63-113662 | 5/1988 |
| JP | 63-113663 | 5/1988 |
| JP | 63-113664 | 5/1988 |
| JP | 63-124293 | 5/1988 |
| JP | 63-141467 | 6/1988 |
| JP | 63-174484 | 7/1988 |
| JP | 63-247812 | 10/1988 |
| JP | 63-276069 | 11/1988 |
| JP | 63-289979 | 11/1988 |
| JP | 63-299582 | 12/1988 |
| JP | 64-013278 | 1/1989 |
| JP | 01-078328 | 3/1989 |
| JP | 01-099122 | 4/1989 |
| JP | 01-120978 | 5/1989 |
| JP | 01-136426 | 5/1989 |
| JP | 01-142918 | 6/1989 |
| JP | 01-150928 | 6/1989 |
| JP | 01-166678 | 6/1989 |
| JP | 01-184691 | 7/1989 |
| JP | 01-209399 | 8/1989 |
| JP | 01-212986 | 8/1989 |
| JP | 01-213853 | 8/1989 |
| JP | 01-276977 | 11/1989 |
| JP | 01-306962 | 12/1989 |
| JP | 01-307944 | 12/1989 |
| JP | 02-838892 | 12/1989 |
| JP | 02-056791 | 2/1990 |
| JP | 02-081385 | 3/1990 |
| JP | 02-113318 | 4/1990 |
| JP | 02-117288 | 5/1990 |
| JP | 02-119307 | 5/1990 |
| JP | 02-146884 | 6/1990 |
| JP | 02-176968 | 7/1990 |
| JP | 02-189753 | 7/1990 |
| JP | 02-288571 | 11/1990 |
| JP | 03-167975 | 7/1991 |
| JP | 03-214919 | 9/1991 |
| JP | 03-243076 | 10/1991 |
| JP | 04-162889 | 6/1992 |
| JP | 04-180480 | 6/1992 |
| JP | 05-103281 | 4/1993 |
| JP | 05-183826 | 7/1993 |
| JP | 06-061935 | 3/1994 |
| JP | 06-090408 | 3/1994 |
| JP | 06-133235 | 5/1994 |
| JP | 06-141250 | 5/1994 |
| JP | 05-339100 | 6/1995 |
| JP | 08-137334 | 5/1996 |
| JP | 08-506469 | 7/1996 |
| JP | 08-196738 | 8/1996 |
| JP | 10-093905 | 4/1998 |
| JP | 10-247344 | 9/1998 |
| WO | WO 87/00884 | 2/1987 |
| WO | WO 88/04507 | 6/1988 |
| WO | WO 89/03085 | 4/1989 |
| WO | WO 90/00847 | 1/1990 |
| WO | WO 90/07844 | 7/1990 |
| WO | WO 90/15507 | 12/1990 |
| WO | WO 91/06367 | 5/1991 |
| WO | WO 92/04801 | 3/1992 |
| WO | WO 93/04473 | 3/1993 |
| WO | WO 93/05452 | 3/1993 |
| WO | WO 93/11639 | 6/1993 |
| WO | WO 93/11640 | 6/1993 |
| WO | WO 93/23957 | 11/1993 |
| WO | WO 94/13107 | 6/1994 |
| WO | WO 94/14281 | 6/1994 |
| WO | WO 94/14282 | 6/1994 |
| WO | WO 94/14284 | 6/1994 |
| WO | WO 94/29811 | 12/1994 |
| WO | WO 95/01056 | 1/1995 |
| WO | WO 95/06389 | 3/1995 |
| WO | WO 95/32583 | 11/1995 |
| WO | WO 96/26605 | 8/1996 |
| WO | WO 96/41478 | 12/1996 |

(56) References Cited

FOREIGN PATENT DOCUMENTS

| WO | WO 97/13368 | 4/1997 |
|---|---|---|
| WO | WO 97/48230 | 12/1997 |
| WO | WO 97/49242 | 12/1997 |
| WO | WO 98/06219 | 2/1998 |
| WO | WO 98/10589 | 3/1998 |
| WO | WO 98/26584 | 6/1998 |
| WO | WO 00/04709 | 1/2000 |

OTHER PUBLICATIONS

"JVC Service Manual: 20" Color TV Model C-2018 (US)," JVC Service & Engineering Company of America, No. 50082, Jan. 1988 (38 pp.).
"JVC Service Manual: 21" Color TV Model C-2018 (CA)," No. 5014, Jun. 1988 (37 pp.).
"JVC Service Manual: 26" Color TV Model C-2627 (US)," JVC Service & Engineering Company of America, No. 5947, Apr. 1987 (40 pp.).
"Prevues," Prevue Guide Brochure, Spring 1984.
"Technological Examination & Basic Investigative Research Report on Image Data Bases," Japan Int'l Society for the Advancement of Image Software, Japan, Mar. 1988 (with partial translation).
"The New Media and Broadcast Policy: An Investigation & Research Conference Report on Broadcasting Diversification," Japan Ministry of Posts & Telecommunications, Mar. 1982 (with partial translation).
"Time Teletext" brochure, "Now, Through the Advances of the Computer Age, You Can Get the Information You Want, When You Want It. Instantly and Conveniently, On Your Home TV Screen," Time Inc., undated.
"Using Videotex to Program Video Cassette Recorders," Broadcast Engineering Reports, vol. 26, No. 6, Nov.-Dec. 1982.
"Wire Delivery," system as described in Cable Data ad, and CableVision index vol. 7, No. 30, Apr. 5, 1982.
"A New Face for Spreadsheets." PC Magazine, Dec. 22, 1987.
"Expert Report of Dr. Gary S. Tjaden," Dec. 18, 2002.
"Expert Report of Dr. Gary S. Tjaden," May 13, 2002.
"Expert Report of Stephen D. Bristow with regard to validity of U.S. Patent Nos. 5,568,272 and 5,508,815," Jun. 10, 2002.
"TV Listings Functional Spec.," Time Video Information Services, Inc., undated.
386 MAX: L'Espace Retrouve, Microsystems, May 1990 (with full English translation).
Antonoff, M., "Stay Tuned for Smart TV," Popular Science, Nov. 1990, pp. 62-65.
Baer, R.H., "Innovative Add-On TV Products," IEEE Transactions on Consumer Electronics, Vol. CE-25, Nov. 1979.
Beddow, David P., "The Virtual Channels Subscriber Interface", Communications Technology, Apr. 30, 1992, pp. 30 and 49.
Bensch, U., "VPV Videotext Programs Videorecorder," IEEE Transactions on Consumer Electronics, vol. 34, No. 3, Aug. 1988, pp. 788-792.
Bestler, C., 42nd Annual Convention & Exposition of the National Cable Television Association, Proceedings from Eleven Technical Sessions, "Flexible Data Structures and Interface Rituals for Rapid Development of OSD Applications," San Francisco, CA., Jun. 6-9, 1993, pp. 223-236.
Brugliera, Vito, "Digital On-Screen Display—A New Technology for the Consumer Interface," Symposium Record Cable Sessions of the 18th International Television Symposium & Technical Exhibition, Jun. 10, 1993, pp. 571-586.
CableVision Advertisement for "TV Decisions," vol. 11, No. 38, Aug. 4, 1986.
Carne, E.B., "The Wired Household," IEEE Spectrum, vol. 16, No. 10, Oct. 1979, pp. 61-66.
Christodoulakis, S. et al., "Browsing Within Time-Driven Multimedia Documents," Conference on Office Information Systems, Palo Alto, CA., publication of the Institute for Computer Research, University of Waterloo, Waterloo, Ontario, Canada, Mar. 23-25, 1988.

Daily Variety Article "Replay to bow 'instant VCR' New digital TV recorder due in Nov. from Replay" by Paul Karon, published on Sep. 8, 1998.
Daily, M., "Addressable Decoder with Downloadable Operation," 42nd Annual Convention and Exposition of the National Cable Television Association, Proceedings from Eleven Technical Sessions, San Francisco, CA., Jun. 6-9, 1993, pp. 82-89.
Damouny, N.G., "Teletext Decoders—Keeping up with the Latest Technology Advances," IEEE Transactions on Consumer Electronics, vol. CE-30, No. 3, Aug. 1984, pp. 429-436.
Decision of Technical Board of Appeal 3.4.2, T 1158/01—3.4.2, Jul. 13, 2004, Official Journal EPO.
Decisions of the Enlarged Board of Appeal G 2/98, Official Journal EPO, May 31, 2001.
DIP II Program Guide, systems as described in DIP II ad.
Edmondson et al., "NBC Switching Central," SMPTE Journal, Oct. 1976, vol. 85, No. 10, pp. 795-805.
Edwardson, S.M. et al., "CEEFAX: A Proposed New Broadcasting Service," SMPTE Journal, Jan. 1974, vol. 83, No. 1, pp. 14-19.
Eitz et al., "Videotext Programmiert Videoheimgeräte (VPV)," Rundfunktech. Mitteilungen, vol. 30, No. 5, Sep. 11, 1986, pp. 223-229.
Hallenbeck's Cross Examination Transcript Day 7, between Gemstar-TV Guide International Inc. et al and Virgin Media Limited et al. dated Jun. 19, 2009.
Hallenbeck's Cross Examination Transcript Day 8, between Gemstar-TV Guide International Inc. et al and Virgin Media Limited et al. dated Jun. 23, 2009.
Hallenbeck's Witness Statement 1, dated Feb. 3, 2009.
Hallenbeck's Witness Statement 2, dated Feb. 13, 2009.
Hallenbeck's Witness Statement 3, dated May 6, 2009.
Hallenbeck's Witness Statement 4, dated May 11, 2009.
Hallenbeck's Witness Statements Exhibit PDH 1 "Contractual Agreement Between Systems Consultants and Triple D Incorporated," Triple D, Inc. Publishers of STV Magazine, OnSat and Satellite Retailer, May 10, 1985.
Hallenbeck's Witness Statements Exhibit PDH 10 Hallenbeck et al., "Personal Home TV Programming Guide," IEEE 1990 International Conference on Consumer Electronics, Digest of Technical Papers, Jun. 6-8, 1990.
Hallenbeck's Witness Statements Exhibit PDH 11 "Mock up of Hallenbeck's "hack" grid display" (undated).
Hallenbeck's Witness Statements Exhibit PDH 2 "SuperGuide—The Satellite Programming Guide."
Hallenbeck's Witness Statements Exhibit PDH 3 "OnSat" Canada's Weekly Guide To Satellite TV, Nov. 15-21, 1987, pp. 1-18.
Hallenbeck's Witness Statements Exhibit PDH 4 "STV A Revolutionary Product 'Electronic Publishing Comes of Age'" by John Gurney, May 1987.
Hallenbeck's Witness Statements Exhibit PDH 5 "Come Join Us at the Largest and Most Spectacular Satellite TVRO Show in the World! SPACE/STTI Las Vegas Show '86," 'Las Vegas Convention Center, Las Vegas Nevada' Feb. 19-21, 1986.
Hallenbeck's Witness Statements Exhibit PDH 6 "SPACE/STTI Nashville Show 'The Nashville Show Agenda'", Sep. 1-3, 1986 pp. 1-22.
Hallenbeck's Witness Statements Exhibit PDH 7 "Satellite Television Technology International SBCA/STTI Present Nashville!" Brochure, Jul. 9-11, 1990, vol. 2, pp. 1-36.
Hallenbeck's Witness Statements Exhibit PDH 9 "OnSat—America's Weekly Guide To Satellite TV," Jun. 10-16, 1990, pp. 1-3.
Hedger, J., "Telesoftware: Home Computing Via Broadcast Teletext," IEEE Transactions on Consumer Electronics, vol. CE-25, No. 3, Jul. 1979, pp. 279-287.
Heller, A., "VPS—Ein Neues System Zur Beitragsgesteuerten Programmaufzeichnung,", (translation by Lawyers and Merchants Translation Bureau, Inc.), Fundfunktechnische Mitteilungen, Issue 4, Jul. 1985 (with full English language translation).
Hofmann et al., "Videotext Programmiert Videorecorder," Rundfunktech. Mitteilungen, Sep. 17, 1982, 9 pages (with full English language translation attached).

(56) References Cited

OTHER PUBLICATIONS

IBM Technical Disclosure Bulletin on "Combined-User Interface for Computers, Television, Video Recorders, and Telephone, Etc.," vol. 33, No. 3B, Aug. 1990, pp. 116-118.
Insight Telecast—various publications, 1992 and 1993.
James, A., "Oracle-Broadcasting the Written Word," Wireless World, Jul. 1973, pp. 314-316.
Jerrold Communications Publication, "Cable Television Equipment," dated 1992 and 1993 pp. 8-2.1 to 8-6 and 8-14.1 to 8-14.3.
Judice, C.N. "Move Over Cable, Here Comes Video Via Voice Lines," Network World, Sep. 1, 1986, p. 26.
Karstad, K., "Microprocessor Control for Color-TV Receivers," IEEE Transactions on Consumer Electronics, vol. CE-26, No. 2, May 1980, pp. 149-155.
Kornhaas W.: "Von der Textprogrammierung über TOP zum Archivsystem" Radio Fernsehen Elektronik., vol. 40, No. 8, Aug. 30, 1991, pp. 465-468, (XP000240875 Veb Verlag Technik. Berlin, DE ISSN: 1436-1574).
Krüger, H. E., "Das Digitale Fernsehkennungssystem ZPS (Digital Video Identification System VIS)," Fernsehtechnik, vol. 35, No. 6, 1982, pp. 368-376.
Las Vegas Review—Journal/Sun "Are You Ready for New VCR Techology?" Jan. 27, 1991.
Long, M.E., "The VCR Interface", 1986 NCTA Technical Papers, pp. 197-202.
Lowenstein, R.L. et al., "The Inevitable March of Videotex," Technology Review, vol. 88, No. 7, Oct. 1985, pp. 22-29.
Mannes, G., "List-Mania, On-Screen, interactive TV guides that can program your VCR are just around the corner", Video Review, May 1992, pp. 34-36.
Mannes, G., "Smart Screens: Development for Personal Navigation Systems for TV Viewers," Video Magazine, vol. 17, No. 9, Dec. 1993.
McKenzie, G.A., "Oracle—An Information Broadcasting Service Using Data Transmission in the Vertical Interval," Journal of the SMPTE, vol. 83, No. 1, Jan. 1974, pp. 6-10.
Merrell, R.G., "Tac-Timer," 1986 NCTA Technical Papers, pp. 203-206.
Newman, Blair, "The Home Bus Standard," publication date Jul. 22, 1988.
NHK Monthly Report on Broadcast Research, "Facsimile Transmission—Various Articles," Dec. 1987, pp. 1-74 (with partial English translation attached).
Page 12 of Phillips TV 21SL5756/00B User Manual.
Pfister, Larry T., "TeleText: Its Time Has Come," Prepared for the IGC Videotex/Teletext Conference, Andover, Massachusetts, Dec. 1982.
Philips Consumer Electronics, User's Manual, Colour Television, 25GR5765, etc.
Philips Consumer Electronics, User's Manual, MatchLine, Colour Television, 28DC2070, 33DC2080.
Printed materials on "Time's Teletext Service," 1982-1983, pp. V79175, V79142, V79143, V79148, and V79151.
Rayers, D.J., "Telesoftware by Teletext," 1984 IEEE Conf. Papers, vol. 240, 3 pages.
Re-Amended Grounds of Invalidity Under CPR Rule 17.1(2)(a), final version, served by Virgin Media dated May 13, 2009.
Roizen, Joseph, "Teletext in the USA," SMPTE Journal, Jul. 1981, pp. 602-610.
Sanyo Technical Review, "VPT System for VHS VCR," vol. 22, No. 1, Feb. 1990 (with English language abstract attached).
Satellite Service Company, "Super Guide IQ® SG 1000," User and Installation Manual, Section I-IV, undated.
Schlender, B.R., "Couch Potatoes! Now Its Smart TV," Fortune, Nov. 20, 1989, pp. 111-116.
Sealfon, Peggy, "High Tech TV," Photographic, Dec. 1984.
Sommerhäuser, W., "Video Programm System: Flexibel Programmieren mit VPS," Funkschau, No. 25, Dec. 1985, pp. 47-51.
Sugimoto, S. et al., "Computer Network: Current Status and Outlook on Leading Science and Technology," Bureau of Science & Technology (Japan),vol. 1, Dec. 1986 (with partial translation).
Sunada, K. et al. "Teletext Color Television Receiver Model C-29M950, C26M940," NEC Technical Journal, vol. 40, No. 8, Serial 216, Sep. 1987, pp. 9-21.
Symposium Record Broadcast Sessions, 14$^{th}$ International TV Symposium, Montreux, Switzerland, Jun. 6-12, 1985, 9 pages.
TV Guide, San Francisco Metropolitan Schedule, Feb. 6, 1989.
Universal Remote Control, Realistic—Owner's Manual, Radio Shack, 1987.
User's manual for Trinitron Colour Television model Nos. KV-A2931D, KV-A2531D and KV-A2131D, Sony Corporation, 1993.
Veith R.H., "Television's Teletext," Elsevier Science Publishing Co., Inc., 1983, pp. 13-20, 41-51.
Zeisel et al., "An Interactive Menu-Driven Remote Control Unit for TV-Receivers and VC-Recorders," IEEE Transactions on Consumer Electronics, vol. 34, No. 3, Aug. 1988, pp. 814-818.
Z-TAC, Zenith Corp., undated material received from Media General.
"Blue Lagoon," Don Snyder Demo Videotape on TVIS System, San Diego & Orlando Broadcast, 1983, Screen Shot (V79390) (submitted on DVD).
Philips TV set, model No. 25 PT 910A, User Manual, 40 pages (undated).
Berniker, M., "TV Guide Going Online," Broadcasting & Cable, Jun. 13, 1994, pp. 49-52.
Cable Data: Via Cable, Addressable Converters: A New Development at CableData, vol. 1, No. 12, Dec. 1981, 11 pages.
"Description of Digital Audio-Visual Functionalities," Digital Audio-Visual Council, DAVIC 1.3.1 Specification Part 1, Technical Report, 1998, 86 pages.
Davis, B., TV Guide on Screen, "Violence on Television," House of Representatives, Committee on Energy and Commerce, Subcommittee o Telecommunications and Finance, Jun. 25, 1993, pp. 93-163.
December, J., Presenting JAVA, "Understanding the Potential of Java and the Web," © 1995 by Sams.net Publishing, pp. 1-208.
Eckhoff, J., "TV Listing Star on the Computer," Central Penn Business Journal/High Beam Research, Mar. 15, 1996, pp. 1-4.
Uniden, UST-4800, Integrated Receiver/Descrambler, Installation Guide, © 1990, Uniden America Corporation, 60 pages.
Uniden, UST-4800, Integrated Receiver/Descrambler, Operating Guide, © 1990, Uniden America Corporation, 24 pages.
Uniden, UST-4800, Super Integrated Receiver/Descrambler, Preliminary Reference Manual, Nov. 12, 1991, 80 pages.

\* cited by examiner

| Channel | Favorite | Marked | Authorized | Next | Deleted |
|---------|----------|--------|------------|------|---------|
| 2 | Y | N | Y | 3 | N |
| 3 | N | N | Y | 5 | N |
| 4 | N | N | N | 0 | Y |
| 5 | N | Y | Y | 6 | N |
| 6 | Y | N | Y | 7 | N |
| 7 | N | Y | Y | 8 | N |
| 8 | Y | Y | Y | 9 | N |
| 9 | N | N | Y | 10 | N |
| 10 | N | Y | Y | 11 | N |
| 11 | Y | Y | Y | 12 | N |
| 12 | N | Y | Y | 2 | N |

UNAUTHORIZED

Please call your cable operator for more information or to subscribe to this channel.

902

904 — Remove from channel line-up
906 — Always remove unauthorized channels
908 — Authorize channel

Dominion: Prequel to the Exorcist        14 HBOE
10:00-12:00
(2005), Years before Father Lancaster Merrin ...

FIG. 9

SYSTEMS AND METHODS FOR PROVIDING CUSTOM MEDIA CONTENT FLIPPING

CROSS-REFERENCE TO RELATED APPLICATIONS

This application claims the benefit of U.S. Provisional Application Nos. 60/834,605, filed Jul. 31, 2006 and 60/903,808, filed Feb. 26, 2007, both of which are hereby incorporated by reference herein in their entireties.

BACKGROUND OF THE INVENTION

This invention relates generally to media systems and, more particularly, to media systems with custom media content flipping support.

An interactive media guidance application, such as an interactive television program guide, allows a user to tune to and display a wide array of media content that is available within a media system. For example, an interactive media guidance application may allow a user to access hundreds of digital or analog television channels. From these channels, a user may be presented with, for example, broadcast television content, on-demand programming, pay-per-view programming, interactive applications, digital music, and any other media content capable of being presented on a user equipment device.

Some media guidance applications, however, are limited in their ability to customize the channel changing (or sometimes called channel "flipping") sequence. This sequence generally includes all the available channel numbers in sequential order by channel number. For example, while a user may typically flip up or flip down in the channel sequence, the ability to create and maintain custom channel flipping sequences (even for a limited period of time) is severely limited.

SUMMARY OF THE INVENTION

In view of the foregoing, a more efficient way for television viewers to manage the large number of channels available, without necessarily having to interact on-screen with an interactive media guidance application, is provided. An interactive media guidance application is provided that supports more flexible and efficient channel flipping. In some embodiments, the enhanced channel flipping is provided by a "flipper" mode of an existing interactive media guidance application. In other embodiments, a separate interactive application may provide the enhanced channel flipping functionality described herein. The flipper mode or application may be activated by holding a channel up or channel down button for a predetermined length of time (e.g., at least one second). The flipper mode may be exited automatically after a period of inactivity (e.g., no channel change requests within another predetermined length of time). In some embodiments, the user may also permanently disable or enable the flipper mode of the interactive media guidance application.

While in flipper mode, a user may selectively add or remove channels from the current channel flipping sequence while the user is channel flipping. A convenient flip banner or overlay may be briefly displayed on any edge of the display screen (or as a docked or undocked window) to confirm any channel flipping sequence change. The flip banner or overlay may display current information about the flipping sequence, including the channel name of the currently tuned or displayed channel, the channel number, the content title, and an indication whether the user is in flipper mode. The flip banner or overlay may also be customized by the user to display more or less information. Channels may be added or removed from the channel flipping sequence permanently, only for the duration of a program currently being displayed on that channel, or for a fixed period of time set by the user (e.g., 20 minutes).

The user may also selectively mark (and unmark) channels as temporary favorite channels while in flipper mode by pressing a single button or key on a user input device (e.g., the "FAV" key). The user may toggle a channel's marked status by pressing the same button or key one or more times. The user may then channel flip only between marked channels. In some embodiments, the user's preexisting favorite channels may also be included in the channel flipping sequence with the marked channels. Channels may be marked as a temporary favorite channels for the duration of a program currently being displayed on that channel or for a fixed period of time set by the user (e.g., 20 minutes).

The interactive media guidance application may also prompt the user to remove unauthorized channels and channels that are restricted by parental controls from the channel flipping sequence. In some embodiments, unauthorized and restricted channels are automatically removed from the channel flipping sequence without tuning to the unauthorized channels. In other embodiments, unauthorized and restricted content may be tuned and blocked (with an informative banner) the first time the user flips to them. The interactive media guidance application may then automatically skip the unauthorized or restricted channels on subsequent channel flipping requests. If a user inputs a parental control access code, such as a parental control PIN, this access code may be saved to memory and all subsequent parental control access code prompts may be suppressed (optionally only for a predetermined length of time or a length of time selected by the user).

In some embodiments, an enhanced last channel function may also be defined in flipper mode. The user may configure the behavior of the last channel function between a number of different modes. For example, the user may choose a traditional last channel function that always tunes to the most recently tuned channel. The user may also choose to back up the "n" most recently tuned channels in the tuning sequence using the last channel function. The last channel function may also return only to channels watched for at least x seconds, where x is a user-configurable value, or the last channel function may only return to marked channels. The user may customize the mode of the last channel function and view a list of last channels using an on-screen overlay or option.

In some embodiments, an accelerated channel surf is enabled in flipper mode where a secondary tuner is used to pre-tune the next channel in the channel flipping sequence. In this way, the channel change request may actually result in a tuner output swap instead of a new tune. This may reduce delays associated with channel flipping, allowing the user to quickly surf between channels in the channel flipping sequence.

In some embodiments, sponsored channel flipping sequences are made available by the cable operator or any suitable third-party. The user may apply any sponsored channel flipping sequence as the user's current flipping sequence for any selected duration. The user's previous flipping sequence may then be automatically restored after the user-selected duration has expired.

BRIEF DESCRIPTION OF THE DRAWINGS

The above and other features of the present invention, its nature and various advantages will be more apparent upon consideration of the following detailed description, taken in conjunction with the accompanying drawings, and in which:

FIG. 2 is an illustrative data structure storing the channel flipping sequence in accordance with one embodiment of the invention;

FIG. 9 is an illustrative unauthorized channel display screen in accordance with one embodiment of the invention;

DETAILED DESCRIPTION

The enhanced channel flipping features and associated functionality described herein may be provided by a stand-alone channel flipper application executing at least partially on a user equipment device, or the features and functionality may be provided by a flipper module or mode of an existing interactive application. If implemented as a flipper module or mode of an existing interactive application, such as an interactive media guidance application, all the display screens, prompts, and overlays shown herein may be integrated with the display screens, prompts, and overlays of the existing application. For example, fonts, colors, and overall layouts may be changed from those depicted to better match the fonts, colors, and overall layouts of the already existing application. Although any type of application may perform the enhanced channel flipping functionality described herein, for convenience this application is referred to as an interactive media guidance application or channel flipper application.

The channel flipper application may allow users to build and maintain one or more custom channel flipping sequences on a user equipment device. Users may add or remove channels from the custom channel flipping sequence while flipping using an intuitive flip banner or overlay that is displayed while the user is channel flipping (or the banner may be briefly displayed after the user requests a channel flipping sequence change). The channel flipper application may also monitor interactive media guidance application data, such as the scheduled start and stop times of programming available on channels added to or removed from the channel flipping sequence. The channel flipper application may then automatically update the custom channel flipping sequence at suitable times, for example, when programming currently being displayed on marked channels begins or ends.

In some embodiments, the custom channel flipping sequences described herein may be remapped to virtual channel numbers (e.g., sequential virtual channel numbers) for ease of access. For example, if the user has created a custom channel flipping sequence including only channels 5, 8, 11, and 13, in some embodiments, these channels may be remapped as virtual channel numbers 1, 2, 3, and 4 (or any other suitable sequential sequence) for ease of user navigation. In this way, if the user would like to manually input a channel number in the custom flipping sequence, the user need not remember the actual channel number (e.g., the number in the local channel map), but rather may input the number of the channel in the custom sequence. In other embodiments, the channels included in a custom channel flipping sequence are not remapped to sequential virtual numbers. The user may use the "channel up" or "channel down" keys (or any other suitable key) in order to flip through the custom channel sequence.

Figure 1:
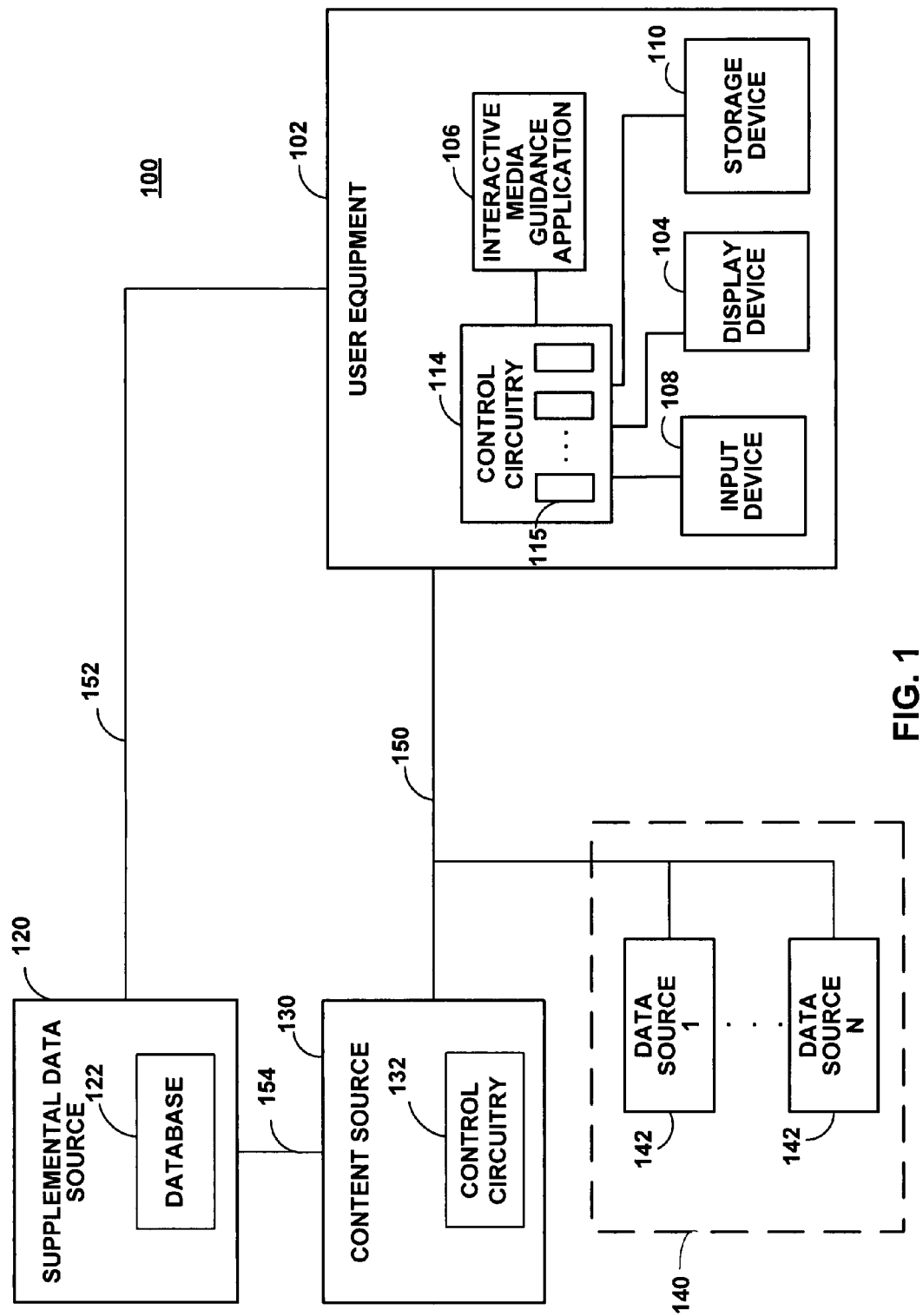
FIG. 1 is an illustrative block diagram of a media system in accordance with one embodiment of the invention.

FIG. 1 shows illustrative interactive media system 100 for performing the channel flipping functionality in accordance with one embodiment of the invention. User equipment device 102 receives content in the form of signals from content source 130 and/or supplemental data source 120 over communications paths 150 and 152, respectively. Any suitable number of users may have one or more user equipment devices, such as user equipment 102, coupled to content source 130, data sources 140, and supplemental data source 120. For the clarity of the figure, however, only a single user equipment device is shown. In addition, although in practice there may be numerous instances of content source 130 and supplemental data source 120, for clarity only one instance of each source has been shown in the example of FIG. 1.

Content source 130 may be any suitable source of media content, such as, for example, a cable system headend, satellite television distribution facility, television broadcast facility, on-demand server (e.g., video-on-demand (VOD) server), Internet or network media/web server, or any other suitable facility or system for originating or distributing passive or interactive content to user equipment 102. Media content that may be provided by content source 130 to user equipment 102 includes broadcast programming, VOD programming, digital music, news, interactive applications (e.g., interactive games), Internet resources and web services (e.g., websites, newsgroups, and chat rooms), and any other content capable of being displayed by, presented to, recorded, or interacted with, using user equipment 102.

Supplemental data source 120 may be any suitable data source configured to provide sponsored channel flipping sequences to user equipment 102. The sponsored sequences may be tailored on a local geographic basis to include only local channels (e.g., local affiliates), channels currently showing local sports, or any other suitable channel lineup. In some embodiments, actors, celebrities, and other suitable personalities may sponsor custom channel lineups and make these lineups available to user equipment 102. For example, a celebrity's favorite channels may be grouped into a sponsored channel flipping sequence.

The celebrity may also prioritize his or her favorite channels so that, for example, the celebrity's favorite channels appear first in the sponsored channel flipping sequence. These sponsored channel flipping sequences may be indexed and stored in database 122.

In some embodiments, database 122 may also store the interactive media guidance application (or a stand-alone channel flipper application) itself. Upon receiving a request from user equipment 102, supplemental data source 120 may transmit the interactive media guidance application directly to user equipment 102 via communications path 152 (or supplemental data source 120 may transmit the interactive media guidance application to content source 130 for transmission to user equipment 120, if desired). In one embodiment, the interactive media guidance application is a self-executing OpenCable Applications Platform ("OCAP") application downloaded by middleware to user equipment 102. User equipment 102 (or a proxy acting on behalf of the user equipment) may periodically query supplemental data source 120 for application updates, or supplemental data source 120 may push application updates to user equipment 102 automatically as updates become available.

Content source 130 and supplemental data source 120 may be configured to transmit signals to user equipment 102 over any suitable communications paths 150 and 152 including, for example, a satellite path, a fiber-optic path, a cable path, or any other suitable wired or wireless path. The signals may be transmitted as a broadcast, multicast, unicast, or any other suitable transmission stream. Content source 130 may also include control circuitry 132 for performing operations on the signals transmitted by content source 130, such as, for example, generating new signals or communicating with user equipment 102 to provide on-demand functionality.

User equipment 102 may receive interactive application data from one or more instances of data sources 140, content source 130, and supplemental data source 120. Data sources 140 may provide data for a particular type of content or for a particular application running on user equipment 102. For example, one data source 142 may provide data for interactive media guidance application 106 (including data for the flipper module or mode of the application) and another data source may provide data for an interactive home shopping application. In some embodiments, data sources 140 may provide data to the applications running on user equipment 102 using a client-server model. There may be one server per data source, one server for all sources, or, in some embodiments, a single server may communicate as a proxy between user equipment 102 and various data sources 140.

Content source 130, supplemental data source 120, and data sources 140 are shown in FIG. 1 as separate elements. In practice, their functionality may be combined into a single mechanism and provided from a single system at a single facility, or their functionality may be provided by multiple systems at multiple facilities. For example, supplemental data source 120, content source 130, and data sources 140 may be combined to provide broadcast television content and associated broadcast television data, including ratings, genre, and content summary information, or other suitable information to user equipment 102.

User equipment 102 may include any equipment suitable for presenting media content to a user. For example, user equipment 102 may include computer equipment, such as a personal computer with a television card (PCTV) and/or Open Cable Unidirectional Receiver (OCUR). User equipment 102 may also include television equipment such as a television and set-top box, a recording device, a video player, a user input device (e.g., remote control, a keyboard, a mouse, a touch pad, a touch screen, and/or a voice recognition/verification module) or any other device suitable for providing a complete, interactive experience. For example, user equipment 102 may include a DCT 2000, 2500, 5100, 6208 or 6412 set-top box provided by Motorola, Inc.

In the example of FIG. 1, user equipment 102 includes control circuitry 114, display device 104, interactive media guidance application 106, storage device 110, and user input device 108, all of which may be implemented as separate devices or as a single, integrated device. In addition to interactive media guidance application 106, other interactive applications, such as an interactive home shopping application, may be implemented on user equipment 102. In some embodiments, these interactive applications may, for example, direct a tuner in control circuitry 114 to display, on display device 104, the content transmitted by content source 130 over communications path 150 and to provide interactive application features.

Display device 104 may be any suitable device capable of presenting human-perceivable media, such as, for example, a television monitor, computer monitor, LCD display, video projection device, holographic projector, or virtual reality simulator. Display device 104 may also be configured to provide audio and other sensory output.

Control circuitry 114 is adapted to receive user input from input device 108, execute the instructions of interactive media guidance application 106, execute the instructions of any other interactive applications, and direct display device 104 to display media content and interactive application display screens and overlays. Control circuitry 114 may include one or more tuners 115 (e.g., analog or digital tuners), encoders and decoders (e.g., MPEG encoders and decoders), processors (e.g., MIPs and/or Motorola 68000 family processors), memory (e.g., RAM, ROM, flash memory, and hard disks), communications circuitry (e.g., cable modem and ATSC 256QAM receiver circuitry), input/output circuitry (e.g., graphics circuitry), connections to the various devices of user equipment 102 (e.g., storage device 110), and any other suitable components for providing analog or digital television programming, Internet content, and custom channel flipping sequences. In one embodiment, control circuitry 114 may be included as part of one of the devices of user equipment 102 such as, for example, part of display 104 or any other device (e.g., a set-top box, television, and/or video player).

Control circuitry 114 may be connected to storage device 110 for storing data from data sources 140, content source 130, or supplemental data source 120. For example, storage device 110 may include one or more digital video recorders (DVRs), hard disks, or any other storage mechanism. Control circuitry 114 may also be configured to execute the instructions of interactive media guidance application 106 from memory, which may include any type of storage or memory mechanism (e.g., RAM, ROM, hybrid types of memory, hard disks, and/or optical drives).

Although, in the illustrated embodiment of FIG. 1, interactive media guidance application 106 is internal to user equipment 102, interactive media guidance application 106 may be implemented externally or partially implemented externally to user equipment 102. For example, interactive media guidance application 106 may be implemented at supplemental data source 120 or content source 130 and may run using a client-server or distributed architecture where some of the application is implemented locally on user equipment 102 in the form of a client process and some of the application is implemented at a remote location in the form of a server process. Interactive media guidance application 106 may also be implemented on any suitable server, computer equipment, or set-top box accessible by user equipment 102. In some embodiments, interactive media guidance application 106 is integrated with another interactive application or is implemented as a standalone application, subprocess, or class (e.g., in an OCAP environment). In one embodiment, interactive media guidance application 106 is completely integrated within another interactive application running on user equipment 102. In this embodiment, the management and administrative functionality of interactive media guidance application 106 may be invoked directly by the other application or the underlying operating system after some user input from input device 108. In some embodiments, interactive media guidance application 106 includes a web-based interface for accessing interactive media guidance application 106 and performing all related functionality from a remote location.

In at least some embodiments, interactive media guidance application 106 is implemented in software. However, an implementation of software and/or hardware may be used in other embodiments. These arrangements are merely illustrative. Other suitable techniques for implementing interactive media guidance application 106 may be used if desired.

Interactive media guidance application 106 may use application data from data sources 140 to determine the type of content currently being displayed on display device 104 or recorded on storage device 110. For example, media guidance application data may include schedule information (e.g., start time and end time information), genre information (e.g., sports, mystery, or comedy), subgenre information, content summaries, actor/director information, ratings (e.g., parental control ratings, editorial ratings, and network popularity ratings), or any other suitable information about media content accessible within media system 100.

Interactive media guidance application 106 may store custom channel flipping sequences in memory (not shown) of control circuitry 114 or on storage device 110. As shown in FIG. 2, described below, the custom channel flipping sequences may include an identification of the channels in the sequence (e.g., by, number, call letters, or other identifier in the local channel map), the order of the sequence, and any optional duration parameters. The optional duration parameters may indicate the length of time a channel should remain in (or be removed from) the channel flipping sequence. One or more custom sequences may be defined on a single user equipment device, such as user equipment device 102. Each custom sequence may be associated with all users of user equipment device 102 or a subset of all the users. Access permissions and/or access restrictions may also be associated with some channel flipping sequences so that, for example, only certain users may view, access, or edit the sequence.

FIG. 2 shows illustrative data structure 200 for storing a channel flipping sequence. In the example of FIG. 2, data structure 200 takes the form of a table in a relational database, but any other data structure may be used in other embodiments. Channel column 202 includes a unique channel identifier. For example, channel column 202 may include the channel numbers or call letters for each channel in the flipping sequence. Favorite column 204 may include a boolean value indicating whether the channel is one of the user's favorite channels. Marked column 206 may include a boolean value indicating whether the channel has been marked by the user as a temporary favorite channel. Authorized column 208 may include a boolean value indicating whether the user is currently authorized to view the channel. For example, premium and on-demand channels that the user has not subscribed to may be considered unauthorized channels. Unauthorized channels may also include channels locked by parental controls in some embodiments. Deleted column 212 may include a boolean value indicating whether the channel has been removed or deleted from the channel flipping sequence identified by data structure 200. Any of marked column 206, deleted column 212, or authorized column 208 may also include a time at which the status is to be rechecked, or a reference to a program showing, after which the status may change.

Finally, next column 210 may include an indication of the next channel in the channel flipping sequence. In some embodiments, next column 210 may be omitted, and the entries in data structure 200 may be stored in sequence order. In other embodiments, channels are stored in channel number order and next column 210 is used to determine the next channel in the channel sequence. In some embodiments, a previous column is also included in data structure 200 so that the user can flip in both directions. In such embodiments, data structure 200 may take the form of a linked list or doubly-linked list for simple navigation.

For ease of illustration, data structure 200 includes only eleven channel entries corresponding to channel numbers 2 through 12. In actual implementations, data structure 200 may include many more channel entries representing the entire channel flipping sequence. Data structure 200 may include entries for all the channels available within media system 100 (FIG. 1) or only the channels included in a particular channel flipping sequence.

To many users, the most important way to watch programming is by quickly surfing through the available channels on the user equipment device. The interactive media guidance application's role in this process may be to quickly, easily, and unobtrusively facilitate channel surfing. The flipper mode of the interactive media guidance application may perform this functionality.

Figure 3:
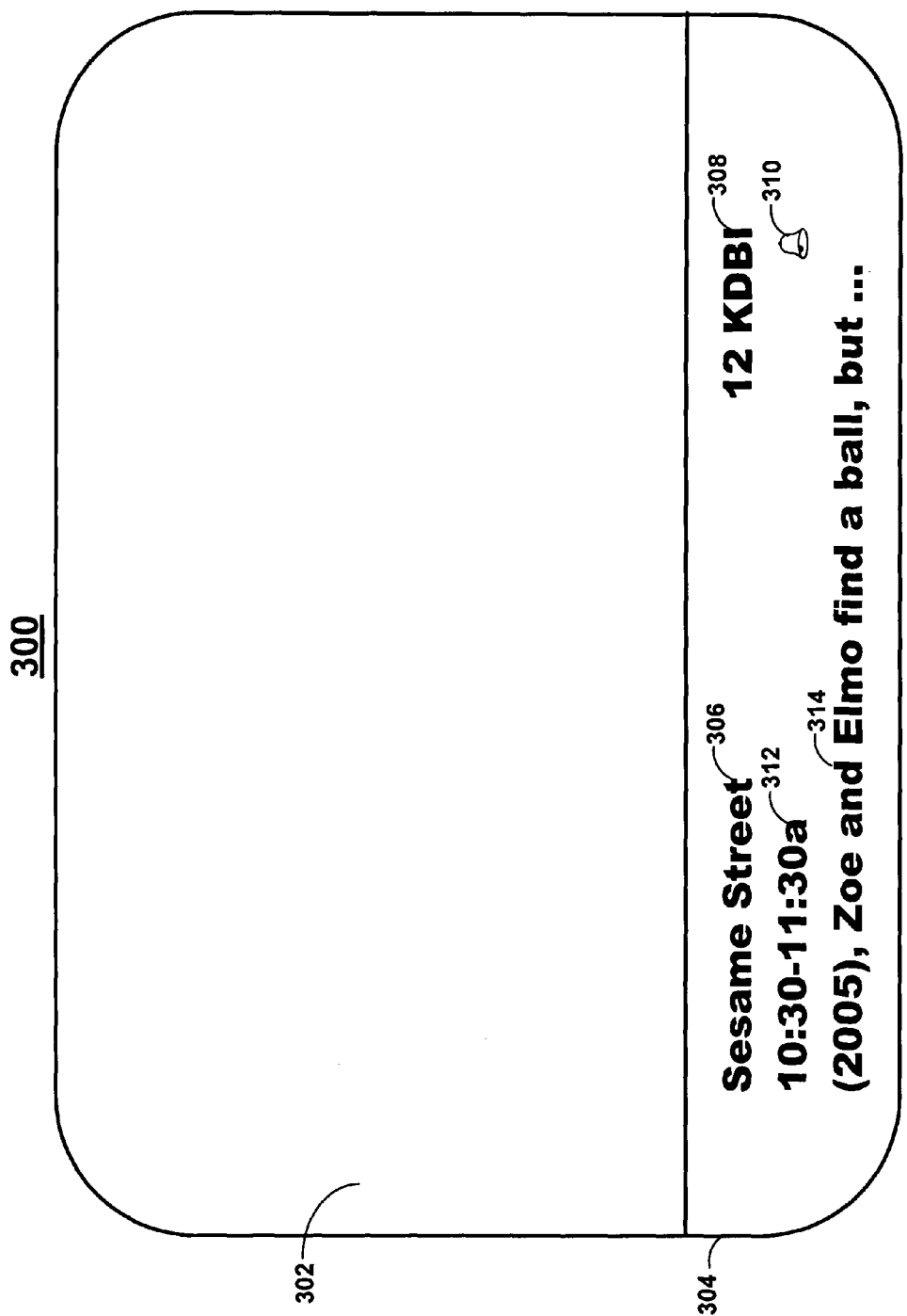
FIG. 3 is an illustrative display screen with flip banner in accordance with one embodiment of the invention.

FIG. 3 shows display screen 300 with flip banner 304. Flip banner 304 may be displayed whenever a new channel is displayed to the user. Flip banner 304 may time out automatically after a predetermined amount of time or flip banner 304 may persist until the user manually dismisses the banner. Flip banner may include various information about the newly displayed channel. For example channel name area 308 may display the channel call letters and number. Content title area 306 may display the title of the content currently displayed on the channel. Time area 312 may display the start time and end time of the content identified in content title area 306. Summary information 314 may include summary or detailed information about the content identified in content title area 306. In addition, one or more status icons may be displayed in status area 310. These status icons may indicate whether the channel or content is a favorite, marked as a temporary favorite, is scheduled for recording, or has a reminder set. Some or all of the information displayed in flip banner 304 may be derived from media guidance application data received from a suitable data source (e.g., data source 142 of FIG. 1).

Flip banner 304 may be displayed while the programming on the channel is displayed behind flip banner 304 in area 302. In some embodiments, the programming is scaled so that flip banner 304 does not block any portion of the channel output. In other embodiments, the programming displayed in area 302 is not scaled, but flip banner 304 is at least partially transparent so that the programming can be seen behind flip banner 304. Flip banner 304 may be displayed to the user while in flipper mode or outside of flipper mode. For example, banner 304 may be displayed to the user whenever a new channel displayed, regardless of what mode the user is in.

In some embodiments, the flipper mode may be activated by holding down the "channel up" or "channel down" key on an input device (e.g., input device 108 of FIG. 1) for a second or longer. The user may disable this behavior via a flipper setup screen (not shown). A user may automatically exit flipper mode after a period of time of inactivity. For example, if the user equipment does not receive a channel change request after a user-configurable amount of time, the user may be automatically exited from flipper mode.

In some embodiments, the user may be able to easily switch between flipper mode and a channel scanner mode. For example, a scan feature may display channels for a user-configurable amount of time in the order of the flipping sequence. A channel scan may resemble an automatic slideshow of channels. U.S. patent application Ser. No. 11/431,143, filed May 8, 2006, which is hereby incorporated by reference herein in its entirety, discloses a channel scanner function. Any of the scan features described in U.S. patent application Ser. No. 11/431,143 may be incorporated into flipper mode features. Although a user may enter and exit flipper mode based on user activity, in some embodiments, a user may permanently enable flipper mode using a flipper setup screen (not shown).

While in flipper mode, the interactive media guidance application may execute an expedited flipping function as the user surfs up and down through the channels in the channel flipping sequence. For example, the user may channel surf using the "channel up" and "channel down" keys while flipper mode is active. As shown in display screen 400 of FIG. 4, the user may be aware he or she is in flipper mode because of icon 406 or indicator 404. Indicator 404, which takes the form of the letters "FLIP" in the example of FIG. 4, may be displayed on top of programming already displayed in main screen area. Indicator 404 may time out after a predetermined amount of time has past, or indicator 404 may persist while the user is in flipper mode.

Similar to indicator 404, icon 406 may indicate to the user the he or she is in flipper mode. Icon 406 may be displayed at any suitable location in the flip banner of the display screen. Any other suitable icons or indicators may also be used to indicate to the user that flipper mode is currently active. In some embodiments, no visual indicator is displayed. Rather, an audible alert or tone is sounded whenever the user enters and/or exits flipper mode. In other embodiments, a combination of an audible alert or tone and a visual indicator is used.

After the user enters flipper mode, a single key press (for example, a DELETE key) on an input device (e.g., user input device 108 of FIG. 1) may remove the current channel from the channel flipping sequence, and the next channel in the sequence may be automatically tuned. The next channel in the sequence may be the next higher or lower channel number, depending on whether the user has most recently pressed a "channel up" or "channel down" button. After a channel has been removed from the channel flipping sequence, the channel may be automatically added back into the flipping sequence after the currently airing program on that channel has ended. For example, media guidance application data may indicate the start and stop times of all programming available on all accessible channels. This information may be used to determine when the channel is added back into the channel flipping sequence.

Figure 5:
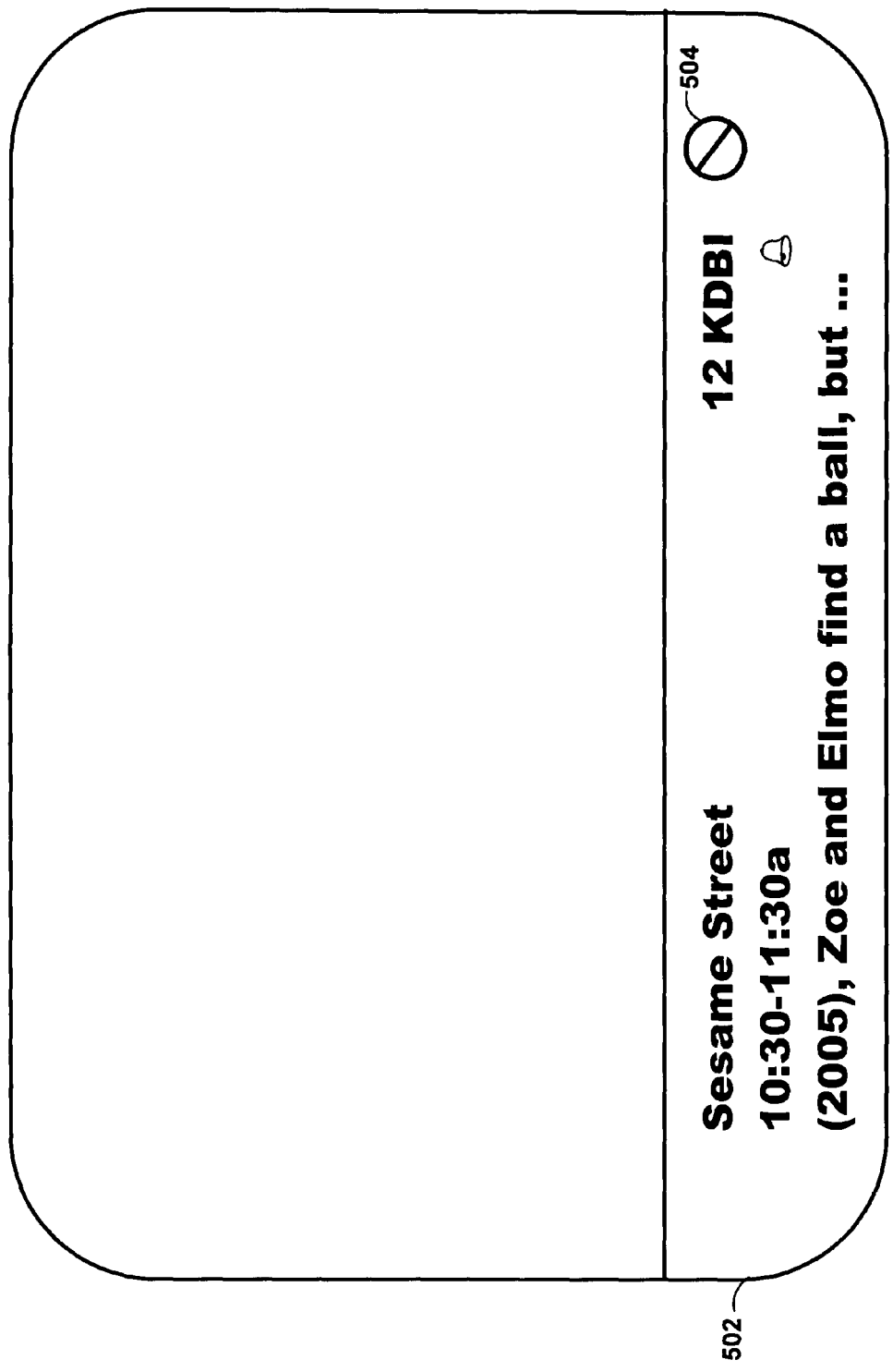
FIG. 5 is an illustrative display screen with a channel removed icon in accordance with one embodiment of the invention.

Holding the DELETE key down for longer than one second (or any other user-configurable length of time) may delete the channel from the channel flipping sequence permanently, regardless of when the program currently airing on that channel ends. FIG. 5 shows display screen 500 which may be displayed after a user deletes a channel from the current channel flipping sequence. In display screen 500, flip banner 502 may be briefly displayed after the user deletes a channel from the current channel flipping sequence. Removed icon 504 may indicate to the user that the channel has been successfully removed from the current channel flipping sequence. If there is no DELETE key on the input device (e.g., user input device 108 of FIG. 1), any other suitable key may be reconfigured for this function.

In a typical usage scenario, a user may press and hold a "channel up" or "channel down" key for longer than one second to enter flipper mode. An audible and/or visual alert or icon may then be displayed or sounded to indicate to the user that he or she has entered flipper mode. After the user has entered flipper mode, the user may change channels as normal. If the user comes to a channel showing programming that the user is not interested in, the user may press the DELETE key to temporarily remove the channel from the channel flipping sequence. The channel may be automatically added back to the channel flipping sequence after the program currently airing on that channel has ended. In this way, the user is given another opportunity to remove the newly airing program from the channel flipping sequence.

Alternatively, the user may press and hold the DELETE key to permanently remove the channel from the channel flipping sequence. For example, the user may never like programming displayed on a certain channel (e.g., the Home and Garden channel) and thus want to permanently remove the channel for all subsequent channel flipping requests.

While in flipper mode, the user may also mark channels of interest as temporary favorite channels. As shown in display screen 600 of FIG. 6, the user has marked channel "12 KDBI" as a temporary favorite channel. The user may have marked this channel because the user liked the content currently being displayed on this channel. Favorite icon 602 may indicate that this channel has been marked as a temporary favorite channel. The user may mark a channel as a temporary favorite channel with a single key press (for example, by holding down the FAV key on an input device for a full three seconds or any other suitable length of time). When the user marks a channel as a temporary favorite, the interactive media guidance application may briefly display the flip banner with favorite icon 602 to confirm the action.

Figure 7:
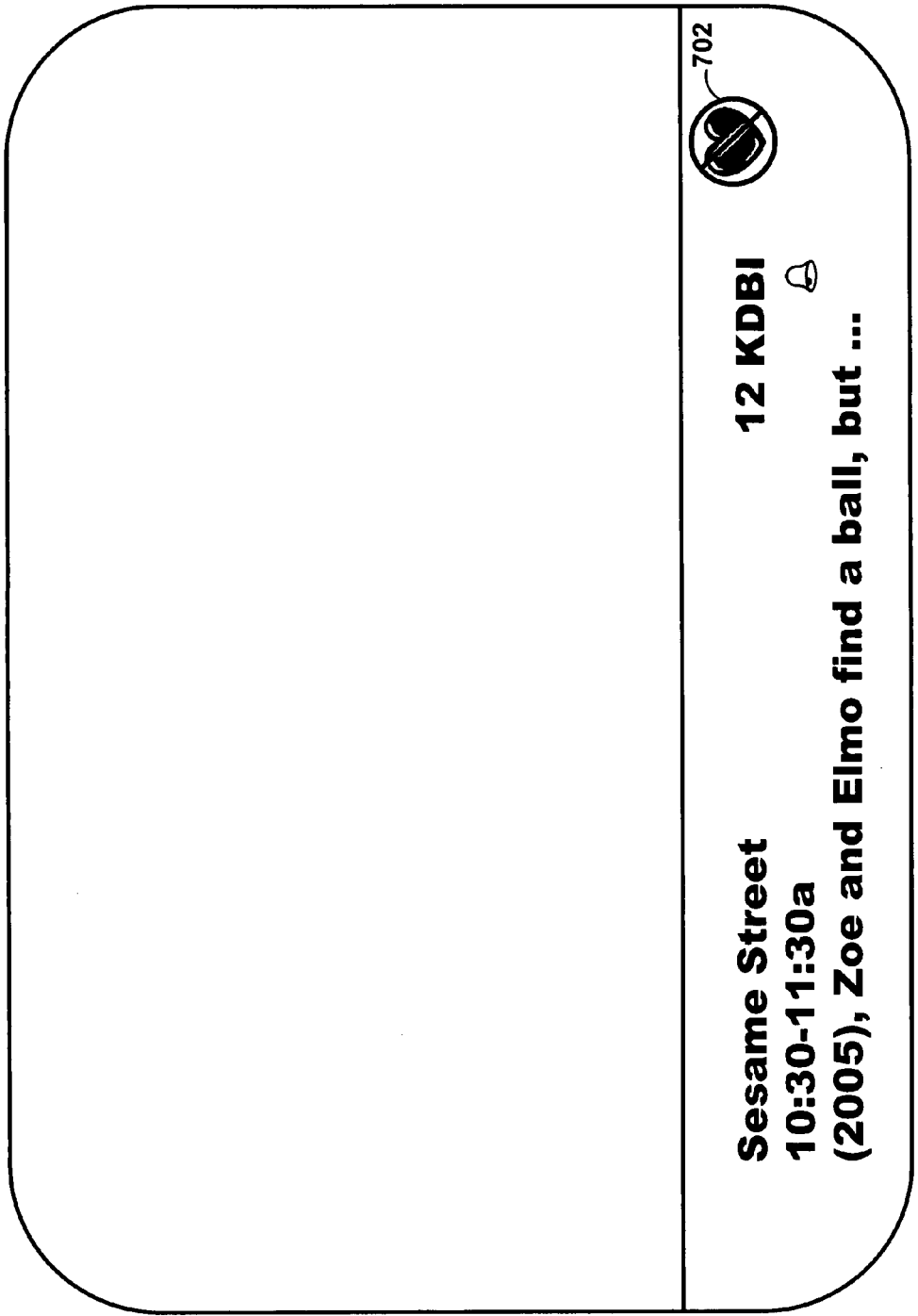
FIG. 7 is an illustrative display screen with an unmarked status indicator in accordance with one embodiment of the invention.

As shown in display screen 700 of FIG. 7, if the current channel is already marked as a temporary favorite channel, pressing and holding the FAV key (or any other suitable key) may unmark the channel. The flip banner may be briefly displayed with unmarked icon 702 (or with no icon). Unmarked icon 702 may indicate to the user that this channel has been successfully unmarked. In some embodiments, each time the user presses and holds the FAV key, the channel may be toggled between marked, unmarked, and deleted status.

Depending on the user's preferences, marking and/or unmarking a channel as a temporary favorite channel may automatically add or remove the channel to the current favorite channel flipping sequence. The channel may be added or removed permanently, for the duration of the program currently airing on the marked or unmarked channel, or for the duration of the current flipper mode session. For example, if the user marks channel "12 KDBI" and this channel is currently showing "Sesame Street" (as indicated in the flip banners of FIGS. 6 and 7), then, in some embodiments, channel "12 KDBI" may be marked as a temporary favorite only during the duration of "Sesame Street." In the illustrated example, this channel may be marked as a temporary favorite only until 11:30 AM, at which time it will be automatically unmarked as a temporary favorite channel, allowing the user to once again evaluate this channel.

When the user presses the FAV key and does not hold it, in some embodiments, the interactive media guidance application may tune between just the marked channels. If there are preexisting favorite channels defined (e.g., in the user's profile), these preexisting favorite channels may also be included in the favorite channel flipping sequence, unless and until they are explicitly deleted from the sequence by the user.

Sometimes a user may flip to a channel that is locked or unauthorized in some way. For example, the channel could be locked by parental controls, or the channel could be a premium channel (or premium service) that the user has not subscribed to. If such a channel is requested and tuned, the interactive media guidance application may automatically note the locked or unauthorized status of the channel and remove this channel from the channel flipping sequence (either permanently or for a user-configurable amount of time). The next time the user attempts to flip to the locked or unauthorized channel, it may be automatically skipped in the tuning sequence. This gives the viewer a chance to unlock or authorize the programming, and then does not burden the user with the need to flip through the same content on later tuning cycles. In some embodiments, the interactive media guidance application may determine if a channel is unauthorized or locked without tuning the channel. For example, media guidance application data may be automatically accessed after receiving a channel change request. If the media guidance application data signals a locked or unauthorized condition (e.g., due to a blocked MPAA rating associated with the content currently being displayed on that channel), then the channel may be removed from the channel flipping sequence before tuning (or attempting to tune) to the channel.

Figure 8:
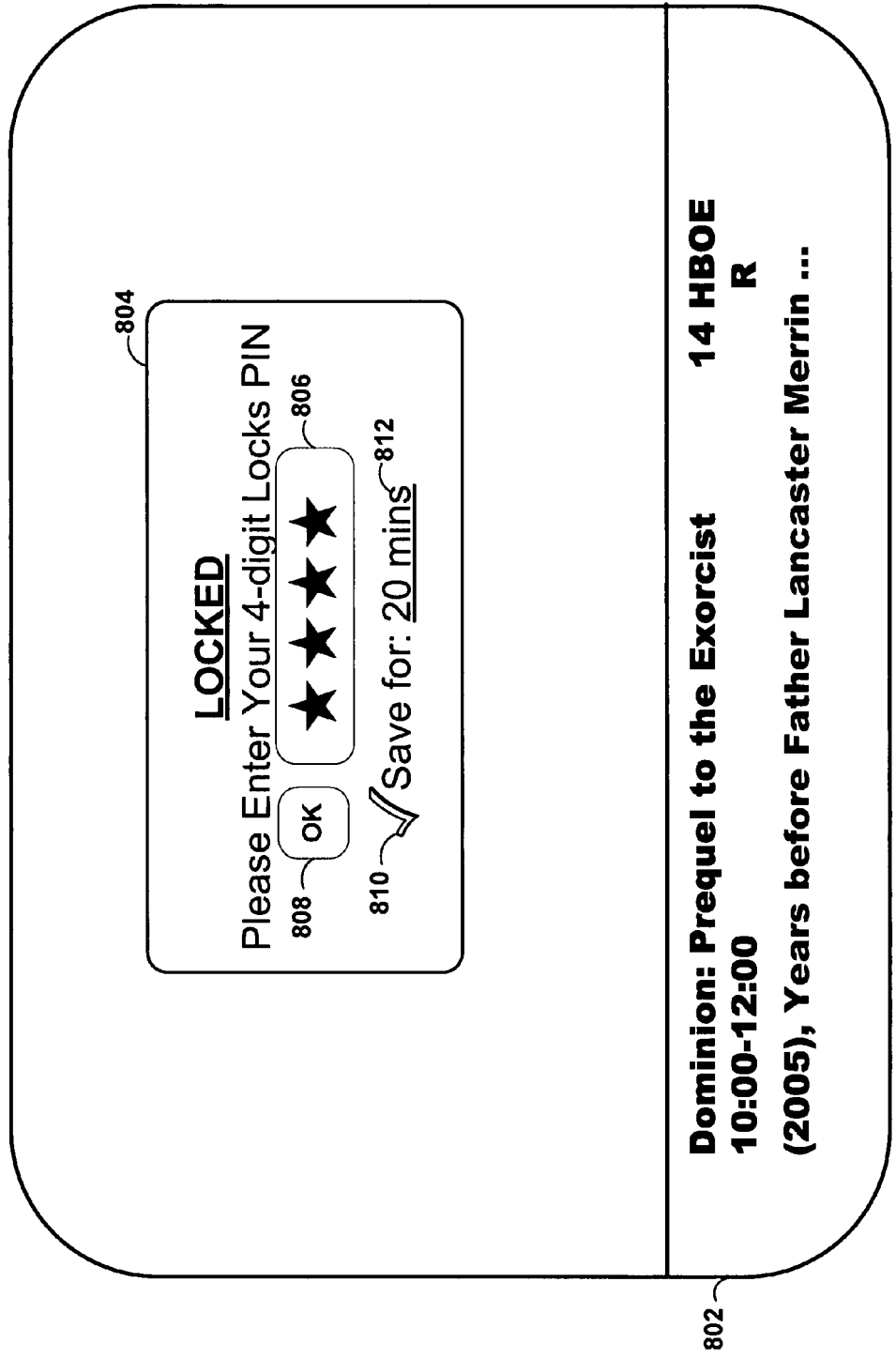
FIG. 8 is an illustrative parental control locked display screen in accordance with one embodiment of the invention.

If a channel is locked by parental controls, then, in some embodiments, a parental control access overlay may be automatically displayed to the user. As shown in the example of FIG. 8, display screen 800 includes parental control overlay 804, which includes parental control access code entry 806, confirmation button 808, and save code option 810. Parental control overlay 804 may be displayed because the user is attempting to access the locked program identified in flip banner 802. The user may input a valid parental control access code into parental control access code entry 806 and press confirmation button 808 in order to display the content on the channel. The user may also choose to save the parental control access code for subsequent requests for locked channels. If the user desires to save the parental control access code, then the user may select a duration in time option 812. Time option 812 may be changed to any suitable time, or the user can select to save the parental control access code until the user exits flipper mode or turns off the user equipment device. Checkmark indicator 810 may inform the user that the parental control access code will be saved after the user presses confirmation button 808.

In some embodiments, the parental control access code may be saved to memory (not shown) of control circuitry 114 (FIG. 14) or to storage device 110 (FIG. 1). If the user requests a locked channel in the channel flipping sequence while the parental control access code is saved, then the saved parental control access code may be automatically used to access the locked channel. This allows the user to more efficiently flip between channels in the channel flipping sequence without the need to re-input a valid parental control access code each time a locked channel is encountered.

After the duration specified in time option 812 expires, the parental control access code may be automatically removed from the system. At this point, the user will be prompted to re-input a valid parental control access code if the user requests a locked channel in the channel flipping sequence.

FIG. 9 shows unauthorized display screen 900. When a user requests a channel that the user is not authorized to view (e.g., a premium channel that the user has not subscribed to), then unauthorized overlay 902 may be displayed to the user. Unauthorized overlay 902 may inform the user of the lack of authorization and present one or more options to the user. Option 904 allows the user to remove the unauthorized channel from the channel flipping sequence (either permanently or for a user-configurable amount of time). Option 906 allows the user to select to always remove unauthorized channels from the channel flipping sequence. If the user has selected option 906, then the interactive media guidance application may automatically remove unauthorized channels from the channel flipping sequence without displaying unauthorized overlay 902. The next channel in the channel flipping sequence may then be automatically tuned and displayed. This behavior allows the interactive media guidance application to learn channels that may not be authorized by attempting to access them.

In some embodiments, the user may also be presented with an option to authorize the channel. For example, the user may navigate a cursor to authorize option 908 to attempt to authorize the channel. After selecting authorize option 908, one or more screens may be displayed to the user confirming the channel authorization request. Through the one or more screens, the user may be allowed to enter payment information or subscribe to the unauthorized channel (e.g., a premium channel). In systems that allow the interactive media guidance application to determine the authorization of channels without tuning to the channels, the interactive media guidance application may skip unauthorized channels on all channel flipping passes. If the user fails to successfully authorize the channel, in some embodiments, the channel may be removed from the current flipping sequence and the next channel in the flipping sequence is automatically tuned and displayed.

Different users may prefer the flip banner, such as flip banner 304 (FIG. 3), to show more or less information. The user therefore may configure the size and contents of the flip banner in some embodiments. For example, the user may select any of "No Flip Banner," "Channel Only," "Channel and Program Title," and "Full Flip Banner" options in a flipper mode setup screen (not shown). The user may also be able to configure the position of the flip banner. For example, with the channel only option, the flip banner may be displayed in any corner. With the program title option, it may be displayed at the top or bottom, or at either side of the display screen.

Figure 10:
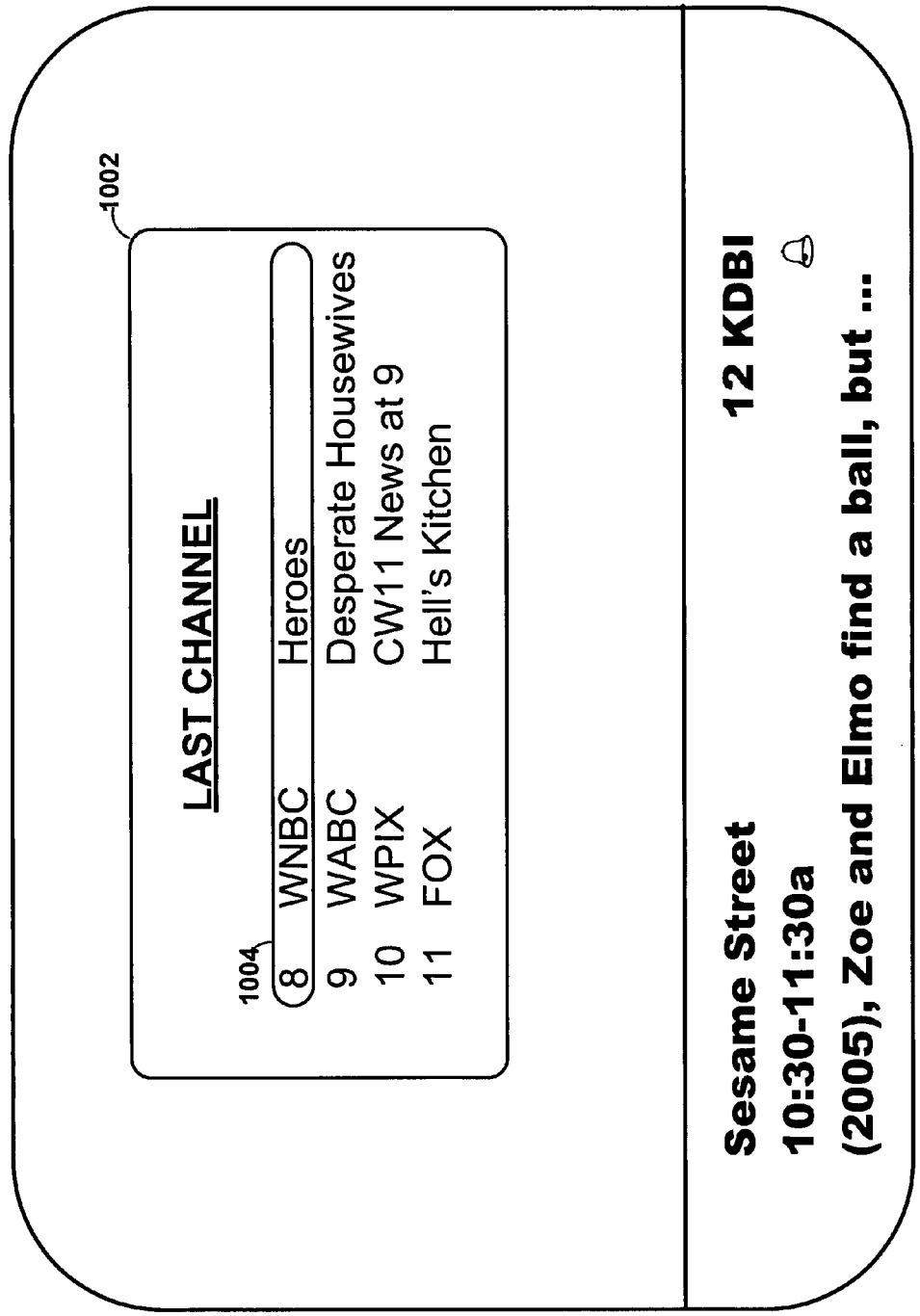
FIG. 10 is an illustrative last channel display screen in accordance with one embodiment of the invention.

The flipper mode may also include an enhanced last channel function. FIG. 10 shows last channel display screen 1000. The user may be allowed to configure the behavior of a last channel function between a number of different modes. These enhanced last channel modes may include, for example, a traditional last channel mode (which always recalls the most recently tuned channel), a back up "n" mode (which recalls up to the "n" most recently tuned channels in the tuning sequence), a back up "n" for at least "x" seconds mode (which recalls up to the "n" most recently tuned channels in the tuning sequence that were watched for at least "x" seconds), a marked channel only mode (which recalls only marked channels), or any other suitable mode. The user may press and hold a last channel button (or any other suitable button) in order to cycle through the available modes. In some embodiments, an on-screen prompt (not shown) may be displayed after the user presses and holds the last channel button for longer than 1 second. This on-screen prompt may list the available last channel modes and allow the user to select the desired mode from the displayed list.

A listing of the actual channels that may be recalled using the selected last channel mode may also be displayed to the user. FIG. 10 shows last channel display screen 1000 that includes last channel overlay 1002. Last channel overlay 1002 includes a listing of the channels stored by the last channel function. As shown in the example of FIG. 10, the last four channels that the user tuned to are displayed in the list. Although the list in last channel overlay 1002 is in sequential order, this need not be the case. For example, if the user has selected the back up "n" for at least "x" seconds mode, then only channels the user settled on for longer then x seconds will be backed up by the last channel function. Last channel overlay 1002 may thus display channel numbers that are out of order. As another example, the user may be flipping by favorite channels or some other custom flipping sequence, in which case the channels in last channel overlay 1002 may be out of sequential order. As yet another example, the user may manually input channel numbers (e.g., using a keypad on input device 108 of FIG. 1) instead of using the "channel up" or "channel down" keys. In this case, the user's most recently tuned channels may be listed in last channel overlay 1002.

The user may select any channel listed in last channel overlay 1002 to view more information about the content currently being displayed on that channel, automatically tune to the channel, or perform any other suitable media guidance function. In some embodiments, the interactive media guidance application may pre-tune highlighted (but not yet selected) channels in last channel overlay 1002. For example, a user may navigate highlight 1004 to any channel in last channel overlay 1002. After a channel listing is highlighted, the channel may be automatically tuned on a secondary tuner (such as one of tuners 115 of FIG. 1) in anticipation of the actual selection of the channel listing. This way, a tuner output swap may be performed if the user actually selects the channel listing. This may reduce delays associated with channel tuning.

In systems with at least two tuners, such as tuners 115 (FIG. 1), if the secondary tuner is not being used for a recording (and is otherwise available), it may be used to speed up the channel flipping process. When the user is pressing the "channel up" or "channel down" key repeatedly, the background tuner may always be tuned to one channel ahead of the currently displayed channel in the sequence. Then, instead of performing a new tune each time the user changes channels, the guide may simply execute a tuner swap. U.S. patent application Ser. No. 11/430,468, filed May 8, 2006, which is hereby incorporated by reference herein in its entirety, discloses additional ways to expedite the channel surfing process. Any of the features disclosed in U.S. patent application Ser. No. 11/430,468 may be combined with features described herein.

The flipper mode may be configured by the user. For example, the user may enable the functionality of the flipper mode, modify the size and position of the flip banner (such as flip banner 304 of FIG. 3), configure the flip banner differently for different channels, permanently delete some channels from the channel flipping sequence, modify the behavior of the enhanced last channel function, enable dual tuner flipping, or configure any other aspect of the flipper mode.

Figure 11:
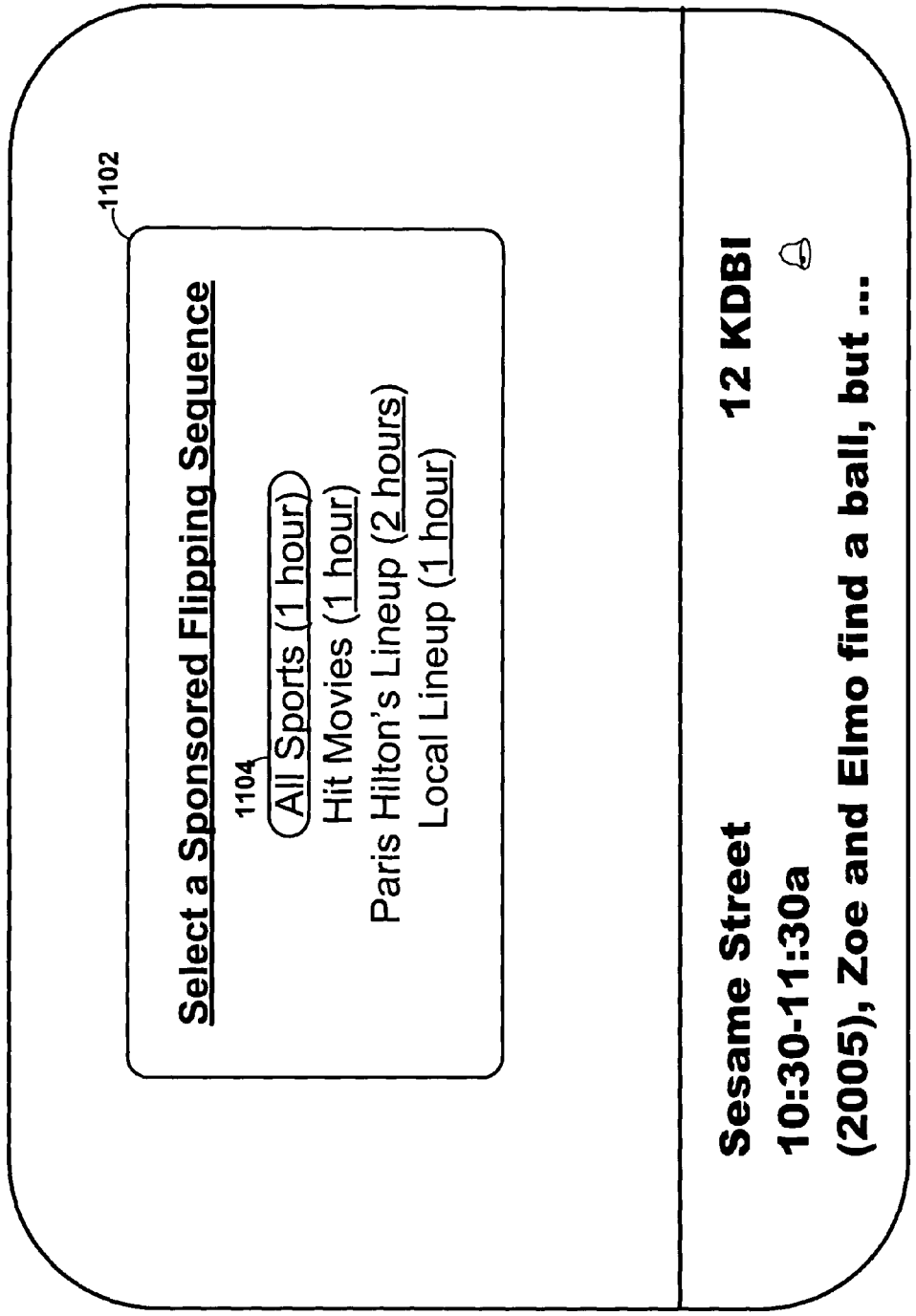
FIG. 11 is an illustrative sponsored flipping sequence display screen in accordance with one embodiment of the invention.

FIG. 11 shows sponsored flipping sequences display screen 1100. In some embodiments, the MSO, cable operator, or a third-party may provide custom, sponsored flipping sequences to the user. These sponsored flipping sequences may include sequences selected by an actor, celebrity, or other personality. The sequences may also include sequences including only channels showing a particular genre or sub-genre of content, channels showing content of a particular rating, or channels with any other suitable characteristic in common. For example, all the channels owned or affiliated with a particular entity (e.g., News Corp.) may be included in a sponsored sequence. Sponsors may pay a fee for sponsoring flipping sequences and they may also select the channels that are included in the sequences and the flipping order.

As shown in FIG. 11, display screen 1100 includes sponsored flipping sequences overlay 1102. This overlay includes a number of custom, sponsored flipping sequences. A user may navigate highlight 1104 to any flipping sequence in the list to view a listing of the channels associated with the flipping sequence or to automatically apply the sequence to the user's current flip mode session. An "all sports" flipping sequence may be defined and include only channels currently showing sporting events (or all sports-related channels, such as NESN, YES, ESPN, and ESPN2). The channels currently showing sporting events may be determined from genre information available in the media guidance application data. A "hit movies" flipping sequence may be defined and include only channels currently showing feature-length movies, movies of a certain ratings, or highly-recommended movies (or all movie channels, such as TMC, HBO, Showtime, and Cinemax). Celebrities and actors may sponsor their own flipping sequences. For example "Paris Hilton's Lineup" may include channels selected by Paris Hilton. In some embodiments, this lineup may mirror the current channel flipping sequence on a user equipment device associated with Paris Hilton. In this way, users (e.g., Paris Hilton fans) can watch the same channels as Paris Hilton. A "local lineup" flipping sequence may also be defined and include only local channels (e.g., local affiliate channels and local news channels).

Any other suitable channel flipping sequence may also be defined. These sponsored sequences may be stored at a supplemental data source (e.g., supplemental data source 120 of FIG. 1) and made available to user equipment device upon request. For example, in a typical usage scenario, a user may navigate highlight 1104 to any desired channel flipping sequence. The user may also specify a duration to apply to the new flipping sequence. After the desired sequence is highlighted, the user may press an INFO button to view a list of channels associated with the highlighted sequence. If the user approves of the channels in the sequence, the user may apply the sponsored channel flipping sequence to the user's own flipper mode session (optionally for the duration specified in flipping sequences overlay 1102). This action may automatically save the user's current flipping sequence, apply the sponsored flipping sequence to the current session, and then restore the user's prior flipping sequence after the current session has ended.

Figure 4:
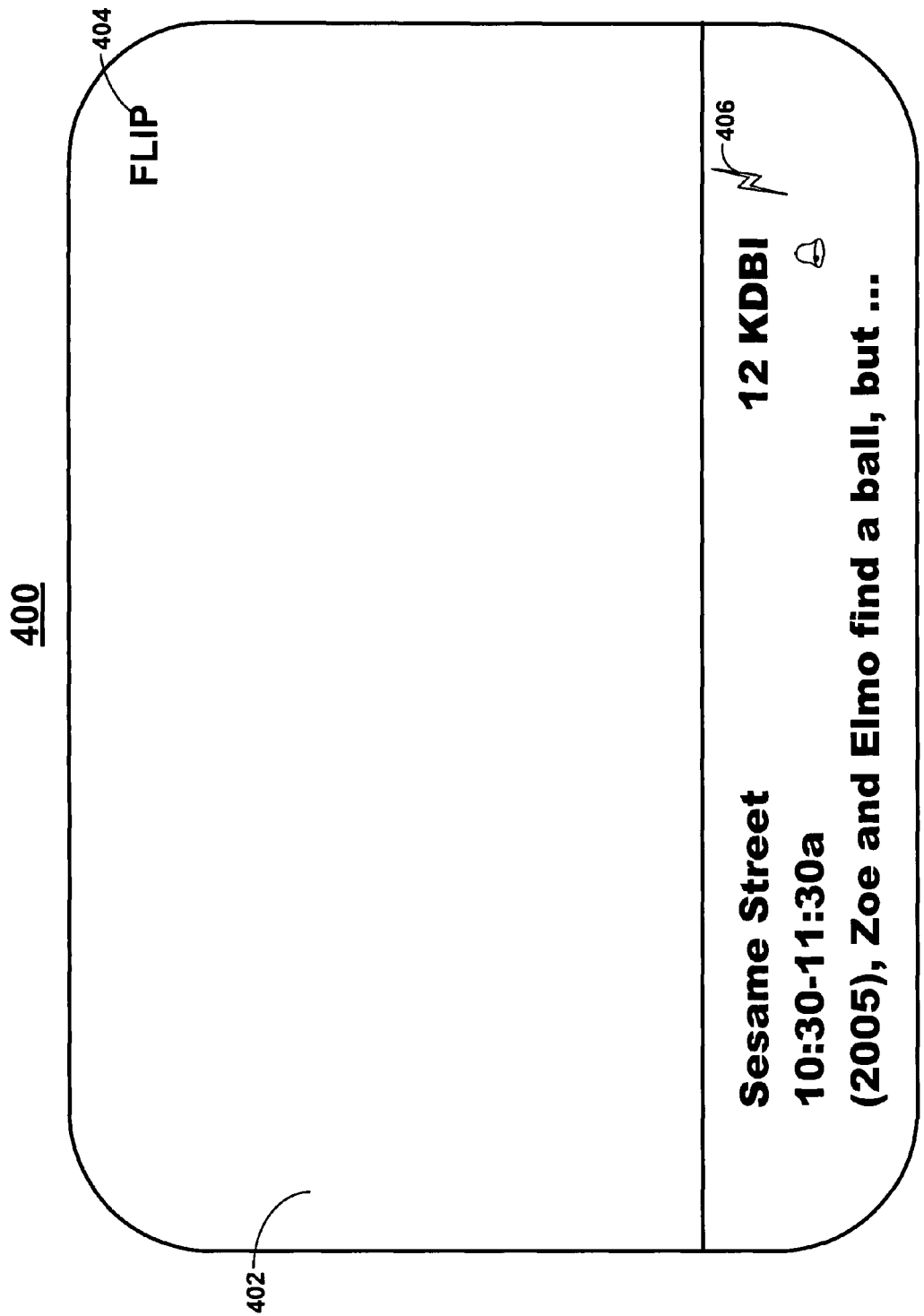
FIG. 4 is an illustrative display screen with flipper mode indicator in accordance with one embodiment of the invention.
Figure 12:
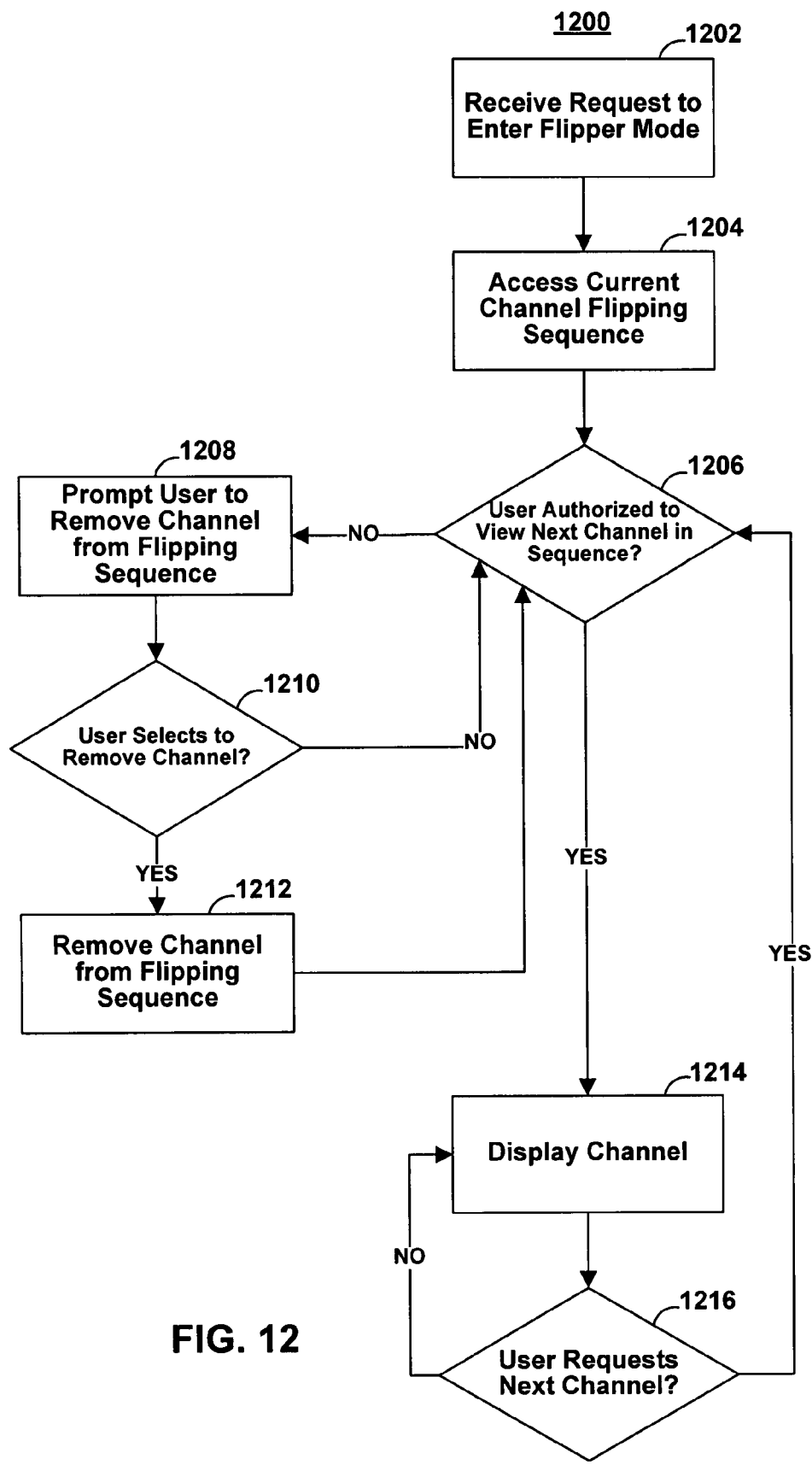
FIGS. 12, 13, 14, and 15 show illustrative processes for supporting the flipper mode features and functionality in accordance with various embodiments of the invention.

FIG. 12 shows illustrative process 1200 for removing unauthorized channels from a channel flipping sequence. At step 1202, a user request to enter flipper mode may be received. For example, the user may press and hold a "channel up" or "channel down" key on an input device (e.g., input device 108 (FIG. 1)) for longer than 1 second to enter flipper mode. The flip banner may then be briefly displayed with a flipper mode icon, such as icon 406 (FIG. 4). Additionally or alternatively, indicator 404 (FIG. 4) may be briefly displayed in the main viewing window to indicate that the user has entered flipper mode.

At step 1204, interactive media guidance application 106 (FIG. 1) may access the current channel flipping sequence. For example the local channel map may be consulted for a listing of all available channels on the user equipment device. At step 1206, interactive media guidance application 106 (FIG. 1) may determine if the user is authorized to view the next channel in the flipping sequence. As described above, in some embodiments, this determination is made without tuning to the channel. In some embodiments, the channel may be tuned, the authorization status may be determined, and, if unauthorized, the audio and video content of the channel may be blocked and a suitable message may be displayed to the user explaining the reason for the blocked channel. If the user is not authorized to view the channel, the user may be prompted to remove the unauthorized channel from the flipping sequence at step 1208. For example, unauthorized overlay 902 (FIG. 9) may be displayed to the user. If the user selects to remove the unauthorized channel from the flipping sequence at step 1210, then interactive media guidance application 106 (FIG. 1) may remove the channel from the current flipping sequence at step 1212. For example, data structure 200 (FIG. 2) may be updated so that the unauthorized channel is automatically skipped in the flipping sequence. In some embodiments, the channel may be automatically removed from the flipping sequence if the user takes no steps to authorize it After the unauthorized channel is removed from the channel flipping sequence at step 1212, or if the user does not select to remove the unauthorized channel from the flipping sequence at step 1210, illustrative process 1200 may return to step 1206 to determine if the user is authorized to view the next channel in the direction of the channel change request. If the user is authorized to view the channel, then the channel may be displayed at step 1214. At step 1216, interactive media guidance application 106 (FIG. 1) may determine if the user has requested the next channel in the channel flipping sequence. If so, illustrative process 1200 may return to step 1206 to determine if the next channel is an authorized channel. If the user has not requested the next channel at step 1216, the current channel may continue to be displayed.

In practice, one or more steps shown in process 1200 may be combined with other steps, performed in any suitable order, performed in parallel (e.g., simultaneously or substantially simultaneously), or removed.

Figure 13:
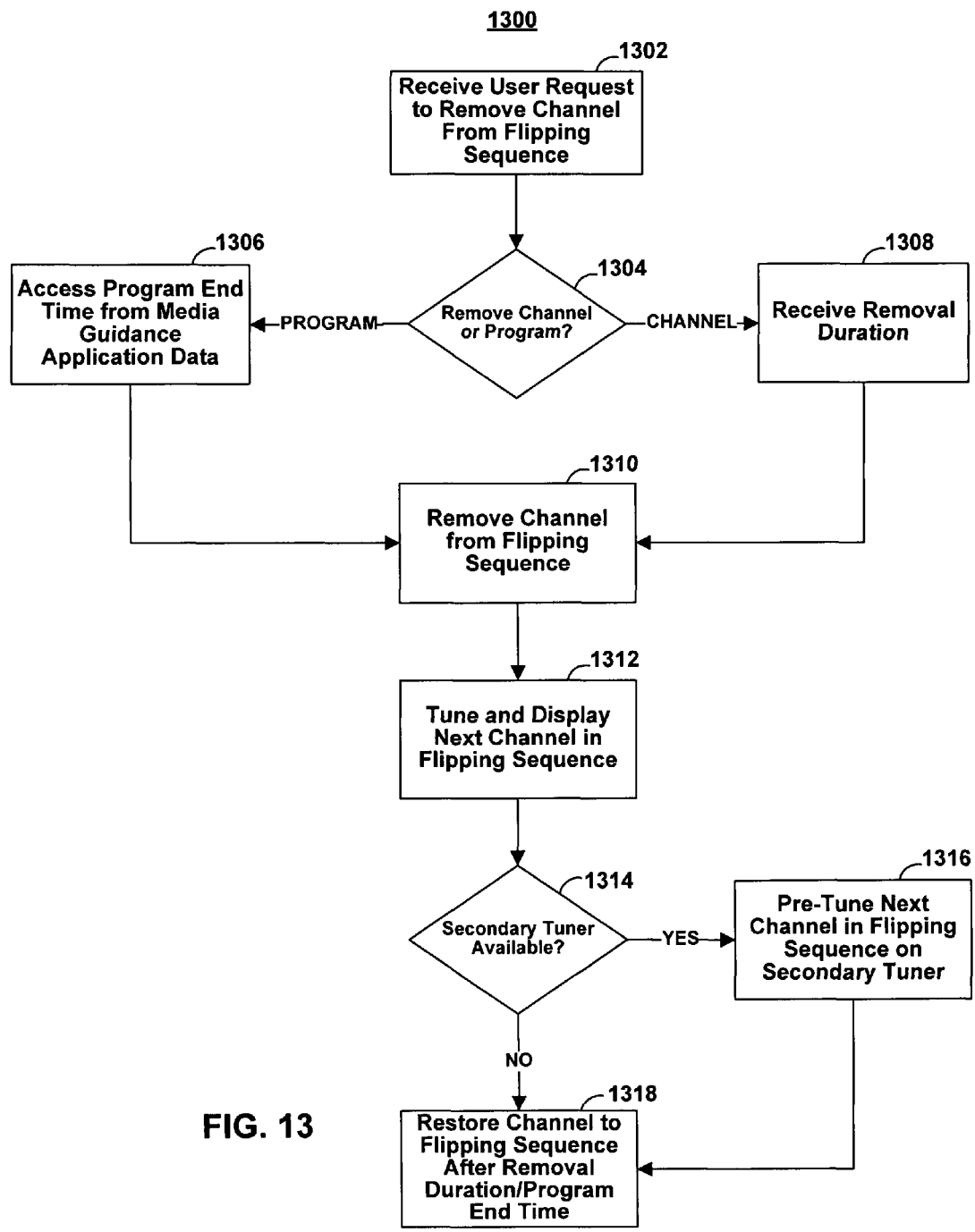

FIG. 13 shows illustrative process 1300 for removing a channel from the current channel flipping sequence. At step 1302, a request to remove a channel is received. For example, the user may press and hold a DELETE key on an input device (e.g., input device 108 of FIG. 1) while in flipper mode in order to remove a channel from the current flipping sequence. At step 1304, interactive media guidance application 106 (FIG. 1) may determine if the user has requested to remove the channel or remove the program currently being displayed on the channel. The user may create flipper mode preferences that define the removal behavior for certain key presses. For example, if the user presses and holds the DELETE key on an input device (e.g., input device 108 of FIG. 1) for one second, then this action may be interpreted as a request to remove the current program. If the user presses and holds the DELETE key for 2 seconds or longer, then this action may be interpreted as a request to remove the current channel. Any other suitable buttons or keys may also be used in other embodiments. If the user has requested to remove the program, at step 1306 interactive media guidance application 106 (FIG. 1) may access the program end time (and/or program duration) from media guidance application data associated with the program currently being displayed. If the user has requested to remove the channel at step 1304, then a removal duration may be received at step 1308. For example, the user may define (in his or her flipper mode preferences) that channels are to be removed for the duration of the current flipper mode session. Other suitable durations may include 30 minutes, 1 hour, 2 hours, or permanently.

At step 1310, the current channel may be removed from the channel flipping sequence. Data structure 200 (FIG. 2) may also be updated accordingly. At step 1312, the next channel in the channel flipping sequence (in direction of channel flipping) may be automatically tuned and displayed. If interactive media guidance application 106 (FIG. 1) determines that a secondary tuner is available at step 1314, then the next channel in the channel flipping sequence may also be automatically pre-tuned. Pre-tuning allows the user equipment to perform a tuner output swap instead of a new channel tune if and when the user requests the pre-tuned channel. This may result in reduced delays associated with channel tuning and/or decoding. For example, if the user selects to remove channel 5 and the user is currently flipping up, then channel 6 may be automatically displayed and channel 7 may be automatically pre-tuned. Finally, at step 1318, the channel that was removed from the channel flipping sequence at step 1310 may be restored to the sequence after the removal duration or the program end time has been reached. In this way, channels may be automatically restored to the channel flipping sequence so that the user may reevaluate the channel.

In practice, one or more steps shown in process 1300 may be combined with other steps, performed in any suitable order, performed in parallel (e.g., simultaneously or substantially simultaneously), or removed.

Figure 6:
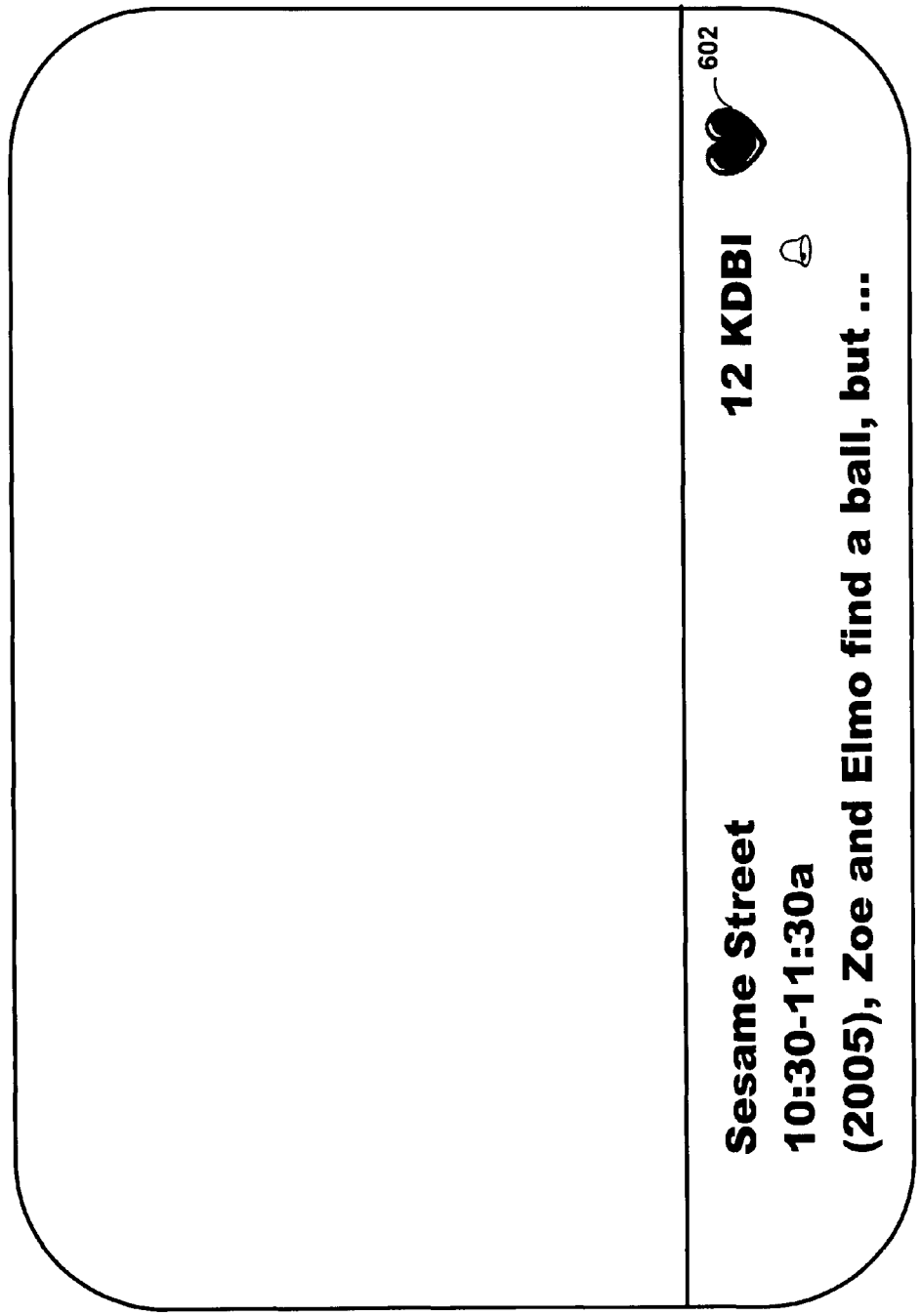
FIG. 6 is an illustrative display screen with marked status indicator in accordance with one embodiment of the invention.
Figure 14:
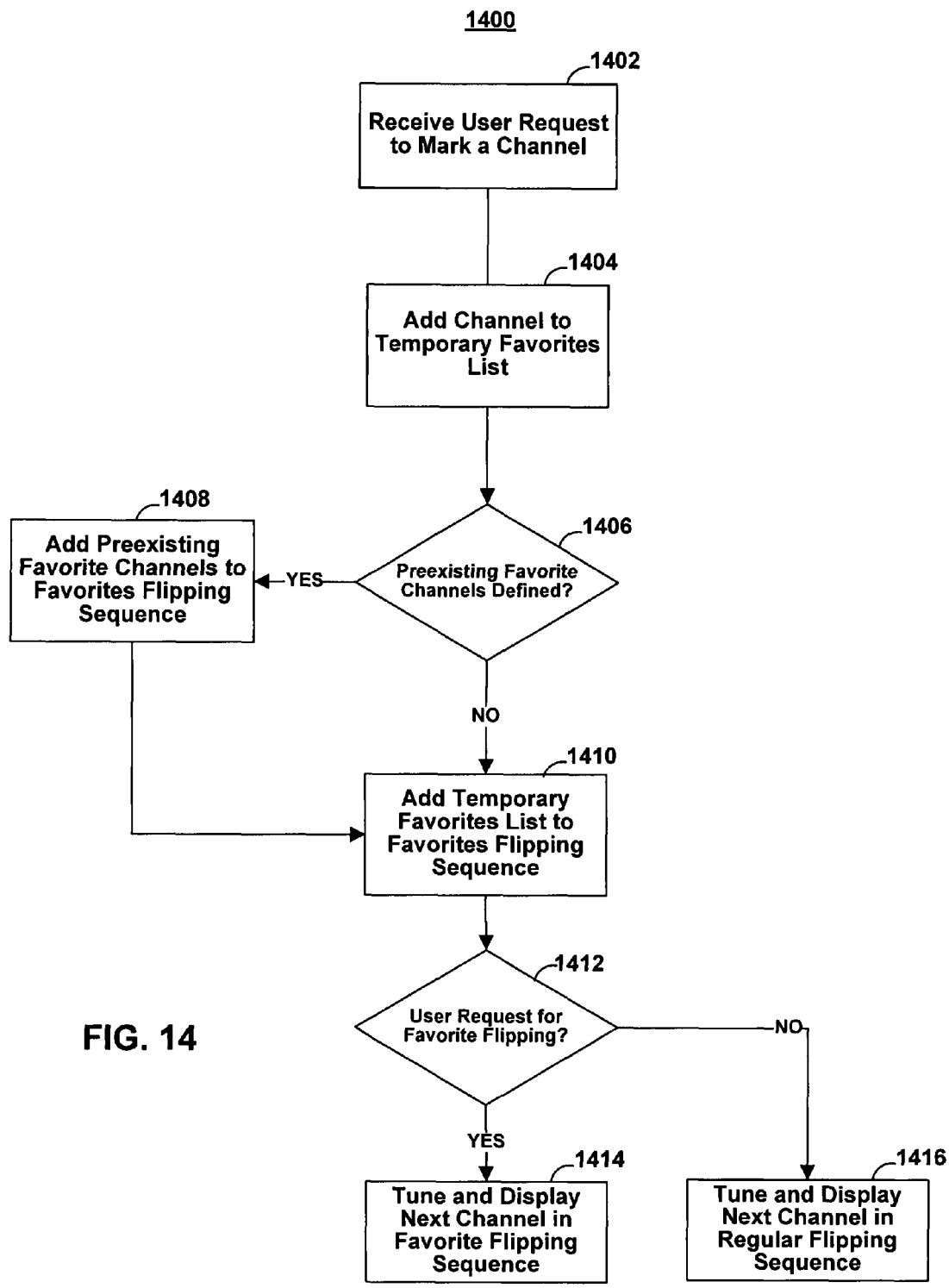

FIG. 14 shows illustrative process 1400 for marking a channel as a temporary favorite channel. At step 1402, a user request to a mark a channel is received. For example, the user may press and hold a FAV key on an input device (e.g., input device 108 of FIG. 1). As shown in FIG. 6, favorite icon 602 may be briefly displayed in a flip banner to indicate that the channel has been marked as a temporary favorite channel. At step 1404, the channel may be added to a temporary favorite channels list. For example, the boolean value in marked column 206 (FIG. 2) of data structure 200 (FIG. 2) may be updated. At step 1406, interactive media guidance application 106 (FIG. 1) may determine if any preexisting favorite channels are defined. For example, the user may set channels as favorite channels outside of flipper mode. These channels may be added to a favorite flipping sequence at step 1408. At step 1410, the user's temporary favorites list may also be added to the favorite flipping sequence. In this way, the user may flip between all marked channels as well as all preexisting favorite channels.

If the user requests to flip through the user's favorite channels at step 1412, then the user's favorite flipping sequence may be used as the channel flipping sequence at step 1414. For example, the user may repeatedly press a FAV key on an input device (e.g., input device 108 of FIG. 1) to flip through the user's favorite flipping sequence. In other embodiments, the user may press the FAV key once and then use the "channel up" or "channel down" key to flip through the user's favorite flipping sequence. Alternatively, the user may flip through the regular flipping sequence at step 1416.

In practice, one or more steps shown in process 1400 may be combined with other steps, performed in any suitable order, performed in parallel (e.g., simultaneously or substantially simultaneously), or removed.

Figure 15:
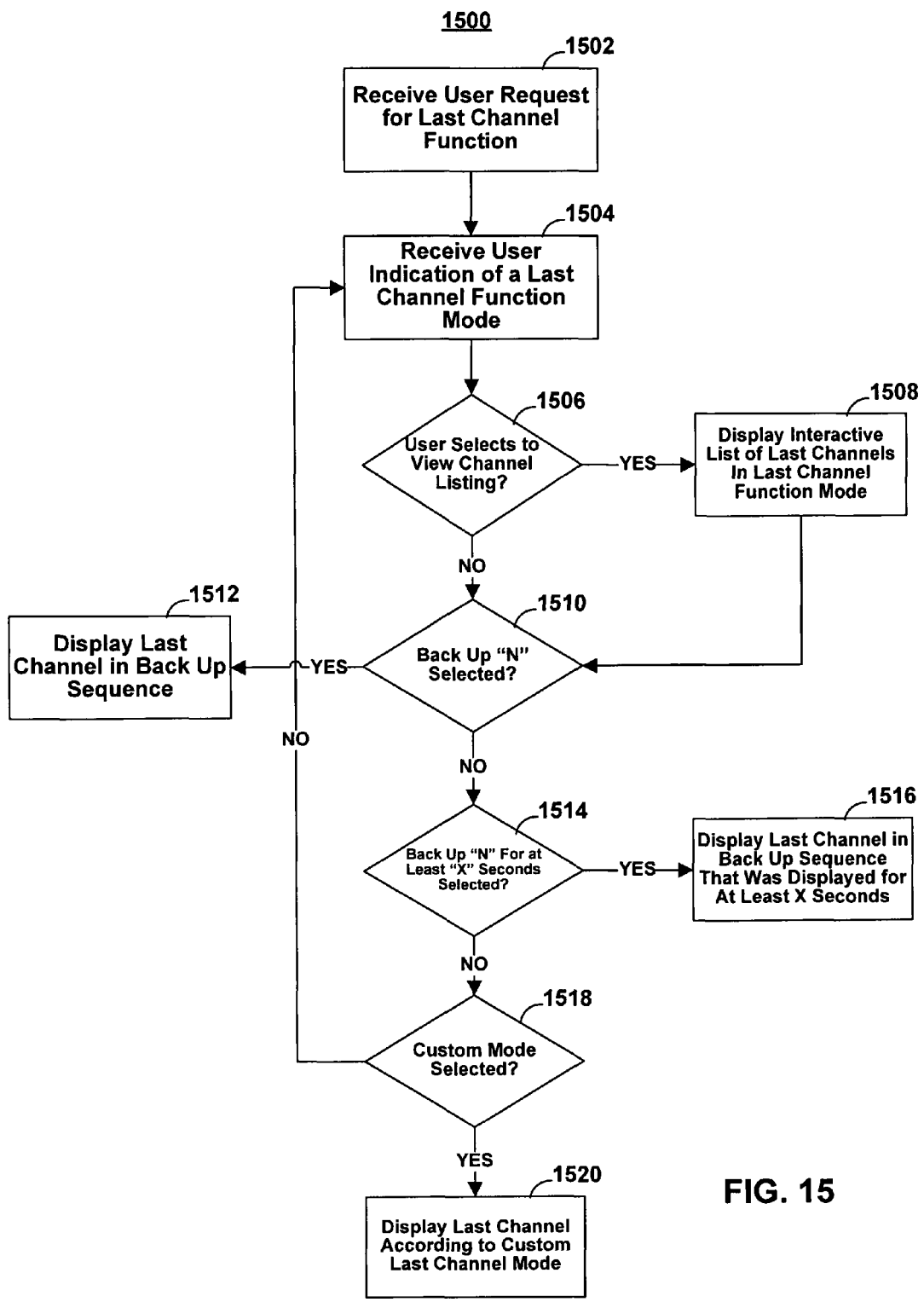

FIG. 15 shows process 1500 for supporting an enhanced last channel function. As previously described, several enhanced last channel modes may be available while the user is in flipper mode (or outside of flipper mode). For example, the user may choose a traditional last channel function that always tunes to the most recently accessed or tuned channel. The user may also choose to back up the "n" most recently tuned channels in the tuning sequence using the last channel function. The last channel function may also return only to channels watched for at least "x" seconds, where x is a user-configurable value, or the last channel function may only return to marked channels.

Interactive media guidance application 106 (FIG. 1) may maintain a list or table of all channels accessed on the user equipment device. The list or table may also include an indication of how long each channel was accessed or displayed on display device 104 (FIG. 1). For example, if the user has requested to back up the last ten channels, then the list of previously accessed channels may always include the last ten channels that the user has accessed. Optional duration parameters may also be defined so that, for example, only the last ten channels that were displayed for at least twenty seconds are included in the back up list.

At step 1502, a user request for the last channel function may be received. For example, the user may press a "last channel" key or button on input device 108 (FIG. 1) or any other suitable button. At step 1504, a user indication of a last channel mode may be received. As previously described, in some embodiments, a list of available last channel modes may be displayed to the user. The user may then select the desired last channel mode. In other embodiments, the user's profile, which may include a preferred or default last channel mode, may be read at step 1504.

After an indication of a last channel mode has been received, at step 1506 interactive media guidance application 106 (FIG. 1) may determine if the user has selected to display a list of channels backed up by the last channel mode. This interactive list may then be displayed to the user at step 1508. For example, last channel overlay 1002 (FIG. 10) may be displayed at step 1508. This list may include a listing of channel numbers, content title, and any other suitable information about the channels backed up using the selected last channel mode. The user may select any channel in the list in order to view additional information about the channel (or the content currently being displayed on the channel) or perform any media guidance application function on the channel (e.g., automatically tune to the channel or schedule a recording).

At step 1510, if the user has selected the back up "n" mode, then at step 1512 the last channel in the back up sequence may be tuned and displayed on display device 104 (FIG. 1). At step 1514, if the user has selected the back up "n" for at least "x" seconds mode, then at step 1516 the last channel in the back up sequence that has been tuned or displayed for at least "x" seconds may be tuned and displayed on display device 104 (FIG. 1). Custom modes may also be defined. For example, only channels marked as temporary favorites and displayed for at least "x" seconds may be defined as a custom mode. Any other suitable custom mode may be defined in other embodiments. If the user selects a custom last channel mode at step 1518, then the last channel in the back up sequence matching the custom mode criteria may be displayed at step 1520.

In practice, one or more steps shown in process 1500 may be combined with other steps, performed in any suitable order, performed in parallel (e.g., simultaneously or substantially simultaneously), or removed.

The above described embodiments of the invention are presented for purposes of illustration and not of limitation, and the present invention is limited only by the claims which follow.

What is claimed is:

1. A method for enhanced channel flipping on a user equipment device, the method comprising:
   receiving identification from a user of a plurality of channels of media content to include in a channel flipping sequence;
   generating the channel flipping sequence based on the received identification, wherein the channel flipping sequence:
      comprises an ordered list of the plurality of channels, and
      each channel of the plurality of channels is tuned in an order determined based on a respective position of the channel in the channel flipping sequence;
   after tuning to a currently tuned channel of the plurality of channels in response to receiving a tuning request, storing a direction value indicating whether the tuning request commanded to tune to the currently tuned channel from a higher or a lower order channel in the channel sequence;
   receiving, after receiving the tuning request, a first user request from a remote input device to remove a first channel from the channel flipping sequence; and
   in response to receiving the first user request to remove the first channel from the channel flipping sequence, 1) removing the first channel from the channel flipping sequence; 2) determining, based on the stored direction value, whether to tune to a next or a previous second channel in the channel flipping sequence; and 3) automatically tuning to the second channel based on the determination of whether to tune to the next or the previous second channel in the channel flipping sequence.

2. The method of claim 1 further comprising displaying a flip banner in response to receiving the first user request from the remote input device to remove the first channel from the channel flipping sequence, the flip banner comprising an icon indicating that the first channel has been removed from the channel flipping sequence.

3. The method of claim 1 further comprising in response to receiving the first user request from the remote input device to remove the first channel from the channel flipping sequence, determining, based on the tuning request, whether to pre-tune to a next or a previous third channel in the channel flipping sequence; and automatically pre-tuning the third channel on a secondary tuner based on the determination of whether to tune to the next or the previous third channel.

4. The method of claim 1 wherein removing the first channel from the channel flipping sequence comprises permanently removing the first channel from the channel flipping sequence.

5. The method of claim 1 wherein removing the first channel from the channel flipping sequence comprises removing the first channel from the channel flipping sequence for a finite duration.

6. The method of claim 5 further comprising:
   accessing media guidance application data relating to the first channel; and
   determining, from the accessed media guidance application data, an end time of a program currently being displayed on the first channel, wherein the finite duration is substantially equal to the length of time until the end time of the program.

7. The method of claim 5 further comprising automatically adding the first channel back to the channel flipping sequence after the finite duration.

8. The method of claim 1 wherein at least one of the first channel, and the second channel are selected from the group consisting of a broadcast television channel, an on-demand channel, a premium channel, a pay-per-view channel, a digital music channel, and an interactive application channel.

9. The method of claim 1 further comprising tuning to one of a plurality of recently tuned channels responsive to receiving a user selection.

10. The method of claim 1, wherein the first user request comprises pressing a button for a predetermined length of time.

11. A system for enhanced channel flipping on a user equipment device, the system comprising:
   memory to store a channel flipping sequence; and
   control circuitry configured to:
      receive identification from a user of a plurality of channels of media content to include in the channel flipping sequence;

generate the channel flipping sequence based on the received identification, wherein the channel flipping sequence:
    comprises an ordered list of the plurality of channels, and
    each channel of the plurality of channels is tuned in an order determined based on a respective position of the channel in the channel flipping sequence;
after tuning to a currently tuned channel of the plurality of channels in response to receiving a tuning request, cause a direction value indicating whether the tuning request commanded to tune to the currently tuned channel from a higher or a lower order channel in the channel flipping sequence to be stored in the memory;
receive, after receiving the tuning request, a first user request from a remote input device to remove a first channel from the channel flipping sequence; and
upon receipt of the first user request to remove the first channel from the channel flipping sequence, 1) remove the first channel from the channel flipping sequence; 2) determine, based on the stored direction value, whether to tune to a next or a previous second channel in the channel flipping sequence; and 3) automatically tune to the second channel based on the determination of whether to tune to the next or the previous second channel in the channel flipping sequence.

12. The system of claim 11 wherein the control circuitry is further configured to display a flip banner in response to receiving the first user request from the remote input device to remove the first channel from the channel flipping sequence, the flip banner comprising an icon indicating that the first channel has been removed from the channel flipping sequence.

13. The system of claim 11 wherein the control circuitry is further configured to, in response to receiving the first user request from the remote input device to remove the first channel from the channel flipping sequence, determining, based on the tuning request, whether to pre-tune to a next or a previous third channel in the channel flipping sequence; and automatically pre-tune the third channel on a secondary tuner based on the determination of whether to tune to the next or the previous third channel.

14. The system of claim 11 wherein the control circuitry is configured to permanently remove the first channel from the channel flipping sequence.

15. The system of claim 11 wherein the control circuitry is configured to remove the first channel from the channel flipping sequence for a finite duration.

16. The system of claim 15 wherein the control circuitry is further configured to:
    access media guidance application data relating to the first channel; and
    determine, from the accessed media guidance application data, an end time of a program currently being displayed on the first channel, wherein the finite duration is substantially equal to the length of time until the end time of the program.

17. The system of claim 15 wherein the control circuitry is further configured to automatically add the first channel back to the channel flipping sequence after the finite duration.

18. The system of claim 11 wherein at least one of the first channel, and the second channel are selected from the group consisting of a broadcast television channel, an on-demand channel, a premium channel, a pay-per-view channel, a digital music channel, and an interactive application channel.

19. The system of claim 11, wherein the first user request comprises pressing a button for a predetermined length of time.

20. A method for enhanced channel flipping on a user equipment device, the method comprising:
    receiving identification from a user of a plurality of channels of media content to include in a channel flipping sequence;
    generating the channel flipping sequence based on the received identification, wherein the channel flipping sequence:
        comprises an ordered list of the plurality of channels, and
        each channel of the plurality of channels is tuned in an order determined based on a respective position of the channel in the channel flipping sequence;
    after tuning to a currently tuned channel of the plurality of channels in response to receiving a tuning request, storing a direction value indicating whether the tuning request commanded to tune to the currently tuned channel from an adjacent channel of a higher order or a lower order in the channel flipping sequence;
    receiving, after receiving the tuning request, a first user request from a remote input device to remove a first channel from the channel flipping sequence; and
    in response to receiving the first user request to remove the first channel from the channel flipping sequence, 1) removing the first channel from the channel flipping sequence; 2) determining, based on the stored direction value, whether to tune to a next or a previous second channel adjacent to the first channel in the channel flipping sequence; and 3) automatically tuning to the second channel based on the determination of whether to tune to the next or a previous second channel adjacent to the first channel in the channel flipping sequence.

21. The method of claim 20, wherein the second channel is the channel in the channel flipping sequence previous to the first channel.

22. A method for enhanced channel flipping on a user equipment device, the method comprising:
    receiving a first user request to tune to a first channel;
    storing a direction value indicating whether the first user request commanded to tune to the first channel from a higher or a lower order channel in a channel flipping sequence, wherein the channel flipping sequence comprises an ordered list of a plurality of channels, and wherein each channel in the plurality of channels is tuned in an order determined by a respective position of that channel in the channel flipping sequence;
    receiving, subsequent to the first user request, a second user request to remove a second channel from the channel flipping sequence; and
    in response to receiving the second user request:
        removing the second channel from the channel flipping sequence;
        determining, based on the stored direction value, whether to tune to a next or a previous third channel in the channel flipping sequence.

23. The method of claim 22, further comprising automatically tuning to the next third channel based on the determination to tune to the next third channel in the channel flipping sequence.

24. The method of claim 22, further comprising automatically tuning to the previous third channel based on the determination to tune to the previous third channel in the channel flipping sequence.

25. A system for enhanced channel flipping on a user equipment device, the system comprising:
a storage device; and
control circuitry configured to:
receive a first user request to tune to a first channel;
cause a direction value indicating whether the first user request commanded to tune to the first channel from a higher or a lower order channel in a channel flipping sequence to be stored in the storage device, wherein the channel flipping sequence comprises an ordered list of a plurality of channels, and wherein each channel in the plurality of channels is tuned in an order determined by a respective position of that channel in the channel flipping sequence;
receive, subsequent to the first user request, a second user request to remove a second channel from the channel flipping sequence; and
upon receipt of the second user request:
remove the second channel from the channel flipping sequence;
determine, based on the stored direction value, whether to tune to a next or a previous third channel in the channel flipping sequence.

26. The system of claim 25, wherein the control circuitry is further configured to automatically tune to the next third channel based on the determination to tune to the next third channel in the channel flipping sequence.

27. The system of claim 25, wherein the control circuitry is further configured to automatically tune to the previous third channel based on the determination to tune to the previous third channel in the channel flipping sequence.

\* \* \* \* \*